United States Patent
Noh et al.

(10) Patent No.: US 9,148,261 B2
(45) Date of Patent: Sep. 29, 2015

(54) METHOD AND APPARATUS FOR PERFORMING A HARQ IN A WIRELESS COMMUNICATION SYSTEM

(75) Inventors: Min Seok Noh, Anyang-si (KR); Sung Ho Moon, Anyang-si (KR); Jae Hoon Chung, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 561 days.

(21) Appl. No.: 13/516,589

(22) PCT Filed: Dec. 17, 2010

(86) PCT No.: PCT/KR2010/009069
§ 371 (c)(1),
(2), (4) Date: Aug. 27, 2012

(87) PCT Pub. No.: WO2011/074910
PCT Pub. Date: Jun. 23, 2011

(65) Prior Publication Data
US 2012/0320839 A1 Dec. 20, 2012

Related U.S. Application Data

(60) Provisional application No. 61/287,202, filed on Dec. 17, 2009, provisional application No. 61/290,013, filed on Dec. 24, 2009.

(30) Foreign Application Priority Data

Dec. 17, 2010 (KR) .................... 10-2010-0129573

(51) Int. Cl.
*H04L 1/18* (2006.01)

(52) U.S. Cl.
CPC .................... *H04L 1/1861* (2013.01)

(58) Field of Classification Search
CPC ..... H04L 5/0053; H04L 5/0055; H04L 5/001; H04W 72/042; H04W 72/0413
See application file for complete search history.

(56) References Cited

U.S. PATENT DOCUMENTS

| | | | |
|---|---|---|---|
| 8,531,962 B2 * | 9/2013 | Chen et al. | 370/329 |
| 2009/0196240 A1 * | 8/2009 | Frederiksen et al. | 370/329 |
| 2010/0067512 A1 * | 3/2010 | Nam et al. | 370/342 |

OTHER PUBLICATIONS

LG Electronics, "Issues on DL ACK/NACK in Carrier Aggregation", 3GPP TSG RAN WG1 #58bis, R1-094160, Oct. 12-16, 2009.
(Continued)

*Primary Examiner* — Jung Park
(74) *Attorney, Agent, or Firm* — Birch, Stewart, Kolasch & Birch, LLP

(57) ABSTRACT

The present invention provides a method and apparatus for performing a HARQ in a wireless communication system. In the method for performing a HARQ according to the present invention, a terminal transmits an uplink data over a PUSCH (Physical Uplink Shared Channel); and receives an ACK/NACK (Acknowledgement/Non-Acknowledgement) signal over a Physical Hybrid-ARQ Indicator Channel (PHICH) corresponding to the PUSCH, with the signal indicating whether the uplink data is received through a plurality of layers. Here, downlink resources to which a PHICH is mapped for each of the plurality of layers do not overlap each other. Those downlink resources to which a PHICH is mapped for each of the plurality of layers can be determined based on different cyclic shift values that are allocated to the plurality of the layers, respectively.

13 Claims, 25 Drawing Sheets

(56) References Cited

OTHER PUBLICATIONS

Qualcomm Europe, "PHICH for Multicarrier Operation", 3GPP TSG RAN WG1 #58bis, R1-094205, Oct. 12-16, 2009.

Samsung, "Concurrent PUSCH and PUCCH Transmissions", 3GPP TSG RAN WG1 #57bis, R1-092669, Jun. 29-Jul. 3, 2009.

Samsung, "PHICH Mapping in Asymmetric Carrier Aggregation", 3GPP TSG RAN WG1 #58bis, R1-094080, Oct. 12-16, 2009.

* cited by examiner

FIG. 5
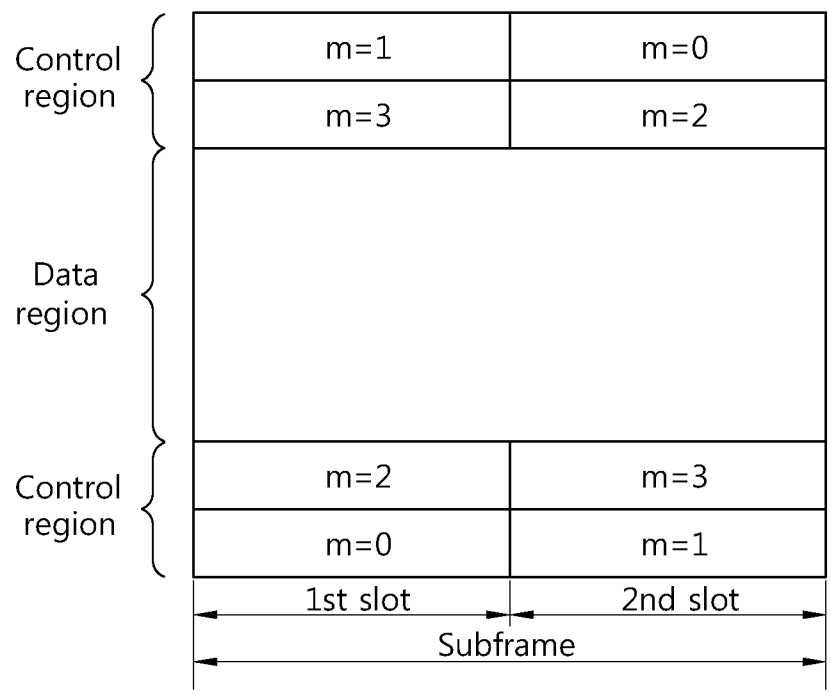
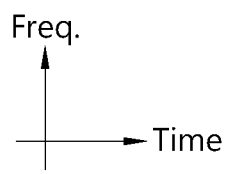

FIG. 12
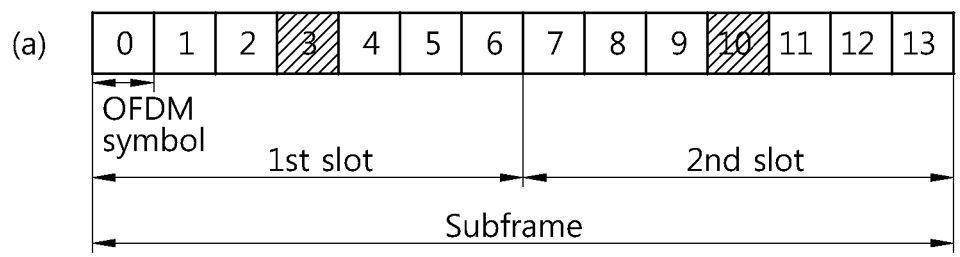
 RS
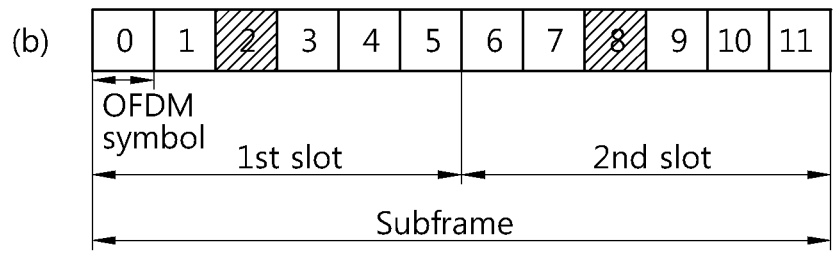

METHOD AND APPARATUS FOR PERFORMING A HARQ IN A WIRELESS COMMUNICATION SYSTEM

CROSS REFERENCE TO RELATED APPLICATIONS

This application is the National Phase of PCT/KR2010/009069 filed on Dec. 17, 2010, which claims priority under 35 U.S.C. 119(e) to U.S. Provisional Application No. 61/287,202 filed on Dec. 17, 2009 and U.S. Provisional Application No. 61/290,013 filed on Dec. 24, 2009 and under 35 U.S.C. 119(a) to patent Application No. 10-2010-0129573 filed in Korea on Dec. 17, 2010, all of which are hereby expressly incorporated by reference into the present application.

BACKGROUND OF THE INVENTION

1. Field of the Invention

The present invention relates to wireless communication and, more specifically, to a method and apparatus for performing a hybrid automatic repeat request (HARQ) in a wireless communication system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

As disclosed in the section 6 of 3GPP (3rd generation partnership project) TS 36.211 V8.8.0 (2009 September) "Technical Specification Group Radio Access Network; Evolved Universal Terrestrial Radio Access (E-UTRA); Physical channels and modulation (Release 8)", examples of downlink control channels used in 3GPP LIE include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. The control information transmitted through the PDCCH is called downlink control information (DCI). The DCI indicates uplink or downlink scheduling information and an uplink transmit power control command for any user equipment (UE) groups. The PHICH carries an acknowledgement (ACK)/non-acknowledgement (NACK) signal for uplink hybrid automatic repeat request (HARM). That is, the ACK/NACK signal for uplink data transmitted by the UE is transmitted through the PHICH.

A plurality of PHICHs can be allocated according to a system environment. In particular, the plurality of PHICHs needs to be allocated simultaneously in a carrier aggregation system for transmitting data by using a plurality of carriers, a MIMO system, etc. A base station (BS) allocates resources to the plurality of PHICHs, and transmits ACK/NACK through the PHICH.

There is a need a method of allocating resources capable of preventing PHICH resources from colliding with each other in a multi-user MIMO (MU-MIMO) environment.

SUMMARY OF THE INVENTION

The present invention provides a method and apparatus for performing a hybrid automatic repeat request (HARQ) in a wireless communication system.

In an aspect, a method of performing, by a user equipment, a hybrid automatic repeat request (HARQ) in a wireless communication system is provided. The method includes transmitting uplink data on a physical uplink shared channel (PUSCH), and receiving an acknowledgement/non-acknowledgement (ACK/NACK) signal indicating whether the uplink data has been received or not, through a plurality of layers on a physical HARQ indicator channel (PHICH) corresponding to the PUSCH, wherein downlink resources to which a PHICH for each of the plurality of layers is mapped do not overlap with each other, and the downlink resources to which the PHICH for each of the plurality of layers is mapped are determined based on different cyclic shift values allocated to each of the plurality of layers respectively.

When a number of the plurality of layers is 2, the cyclic shift value allocated to each of the plurality of layers may have a difference of 4.

When a number of the plurality of layers is 4, the cyclic shift value allocated to each of the plurality of layers may have a difference of 2.

The cyclic shift value allocated to each of the plurality of layers may be any one of 0 to 7.

One of the cyclic shift values allocated to each of the plurality of layers may be determined by a cyclic shift field within downlink control information (DCI) transmitted through a physical downlink control channel (PDCCH).

The downlink resources to which the PHICH for each of the plurality of layers may be mapped are determined based on an equation $$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}, \text{ wherein}$$

$n_{PHICH}^{group}$ is a PHICH group index, $n_{PHICH}^{seq}$ is an orthogonal sequence index within a PHICH group, $I_{PRB\_RA}^{lowest\_index}$ is an index of a smallest physical resource block (PRB) from among PRBs to which the PUSCH is mapped, $n_{DMRS}$ is an uplink demodulation reference signal (DMRS) cyclic shift parameter, $N_{PHICH}^{group}$ is a number of PHICH groups, and $N_{SF}^{PHICH}$ is a spreading factor (SF). The $N_{PHICH}^{group}$=4 and the $2N_{SF}^{PHICH}$=4.

The method may further include transmitting re-transmission data of the uplink data based on the ACK/NACK signal.

In another aspect, a method of performing, by a user equipment, a hybrid automatic repeat request (HARQ) in a wireless communication system is provided. The method includes transmitting, by a first user equipment and a second user equipment, first uplink data and second uplink data, respectively, to a base station on a physical uplink shared channel (PUSCH), and transmitting, by a base station, a first acknowledgement/non-acknowledgement (ACK/NACK) signal and a second ACK/NACK signal indicating whether the first uplink data and the second uplink data have been received or not, to the first user equipment and the second user equipment, respectively, through a plurality of layers on a physical HARQ indicator channel (PHICH) corresponding to the PUSCH, wherein downlink resources to which a PHICH for each of the plurality of layers is mapped are determined based on cyclic shift values allocated to each of the plurality of layers respectively.

When a number of the plurality of layers is 2, the cyclic shift value allocated to each of the plurality of layers may have a difference of 4.

When a number of the plurality of layers is 4, the cyclic shift value allocated to each of the plurality of layers may have a difference of 2.

The cyclic shift value allocated to each of the plurality of layers may be any one of 0 to 7.

The downlink resources to which the PHICH for each of the plurality of layers is mapped are determined based on an equation $$n_{PHICH}^{group} = (I_{PRB\_RA}^{lowest\_index} + n_{DMRS} + n_{OCC}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS} + n_{OCC}) \bmod 2N_{SF}^{PHICH},$$

wherein $n_{PHICH}^{group}$ is a PHICH group index, $n_{PHICH}^{seq}$ is an orthogonal sequence index within a PHICH group, $I_{PRB\_RA}^{lowest\_index}$ is an index of a smallest physical resource block (PRB) from among PRBs to which the PUSCH is mapped, $n_{DMRS}$ is an uplink demodulation reference signal (DMRS) cyclic shift parameter, $N_{PHICH}^{group}$ is a number of PHICH groups, $n_{OCC}$ is an OCC index, and $N_{SF}^{PHICH}$ is a spreading factor (SF).

A hybrid automatic repeat request (HARQ) can be efficiently performed by preventing resources to which a plurality of PHICHs is mapped from colliding with each other.

BRIEF DESCRIPTION OF THE DRAWINGS

FIG. 5 shows the structure of an uplink subframe.
FIG. 12 shows examples of a subframe through which a reference signal is transmitted.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
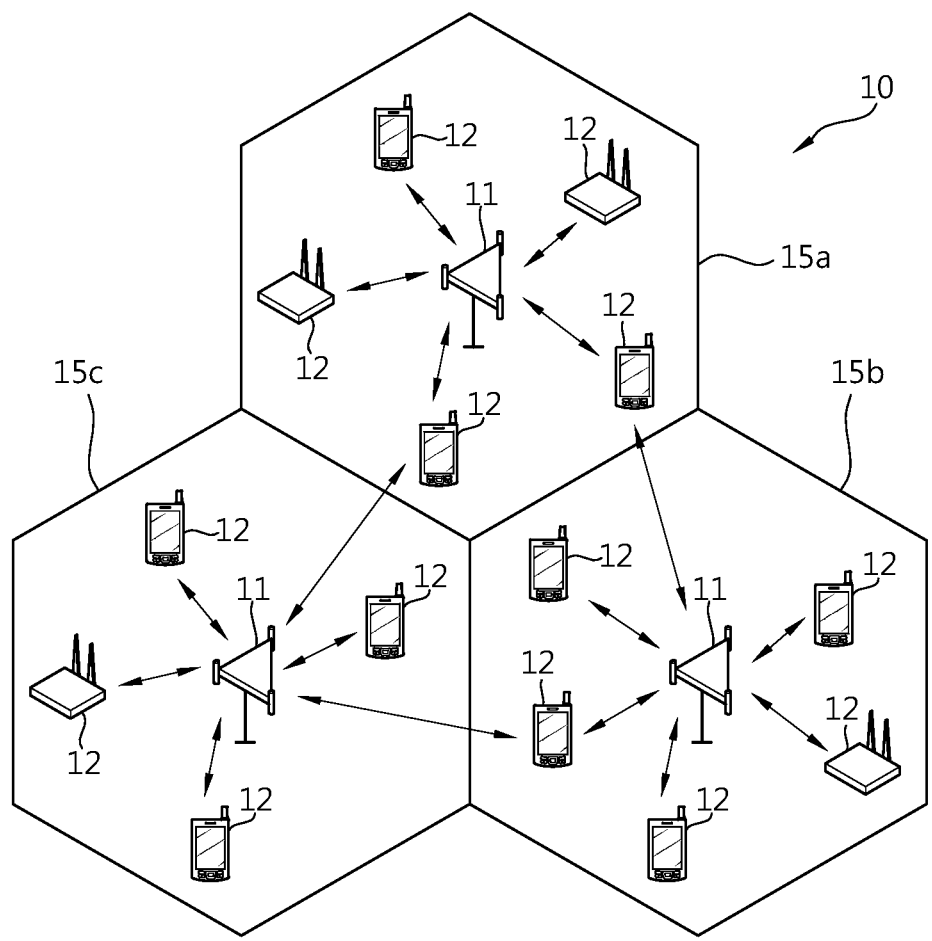
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MINIO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
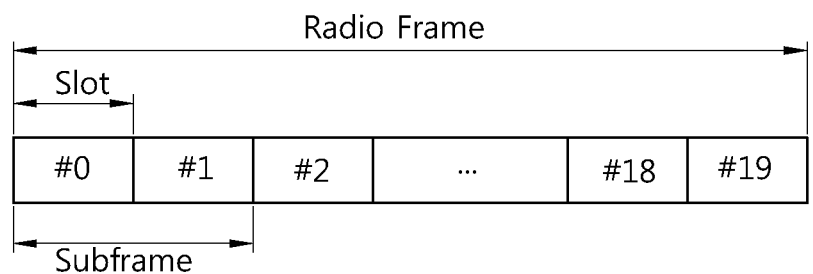
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the HE can be simultaneously performed. In a TDD system in which an uplink transmission and a downlink transmission are discriminated in units of subframes, the uplink transmission and the downlink transmission are performed in different subframes.

Figure 3:
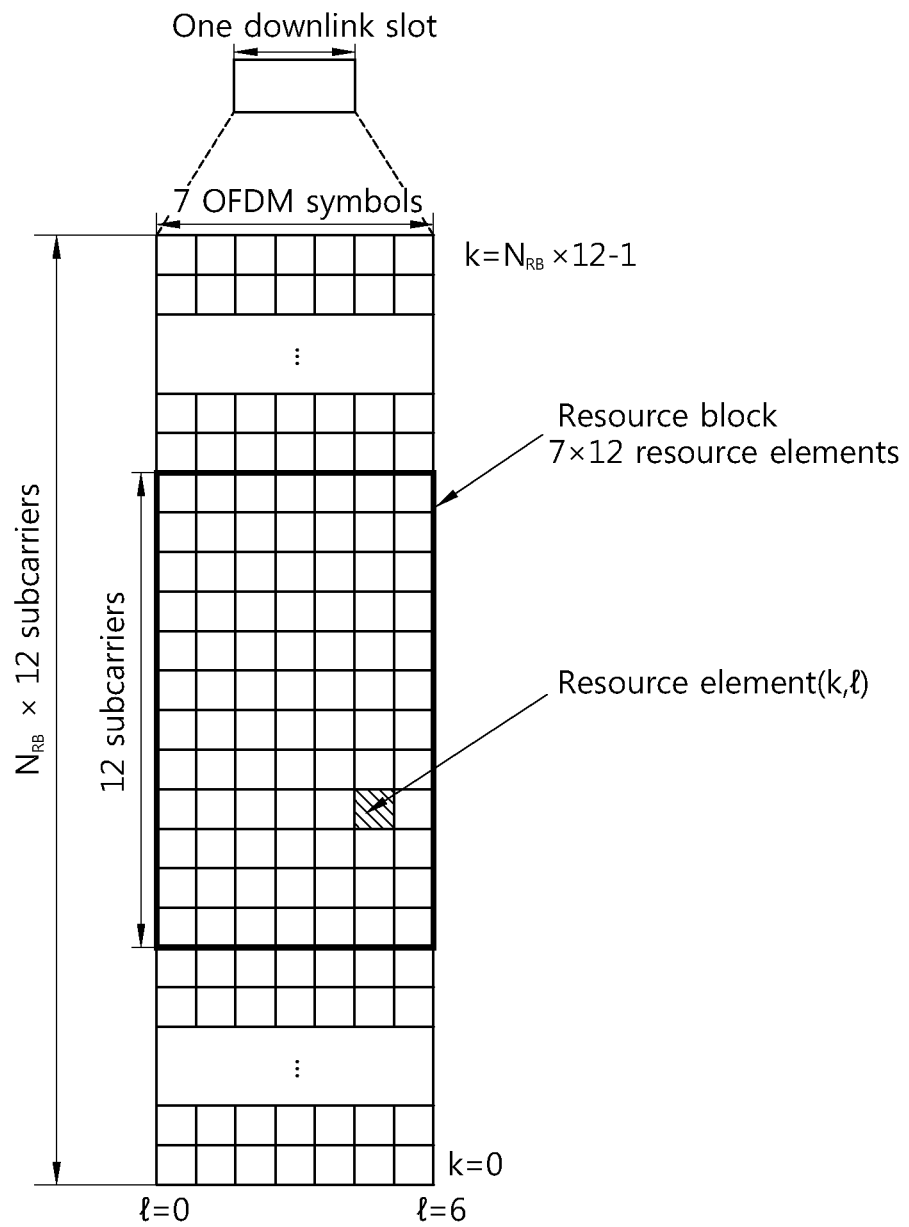
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
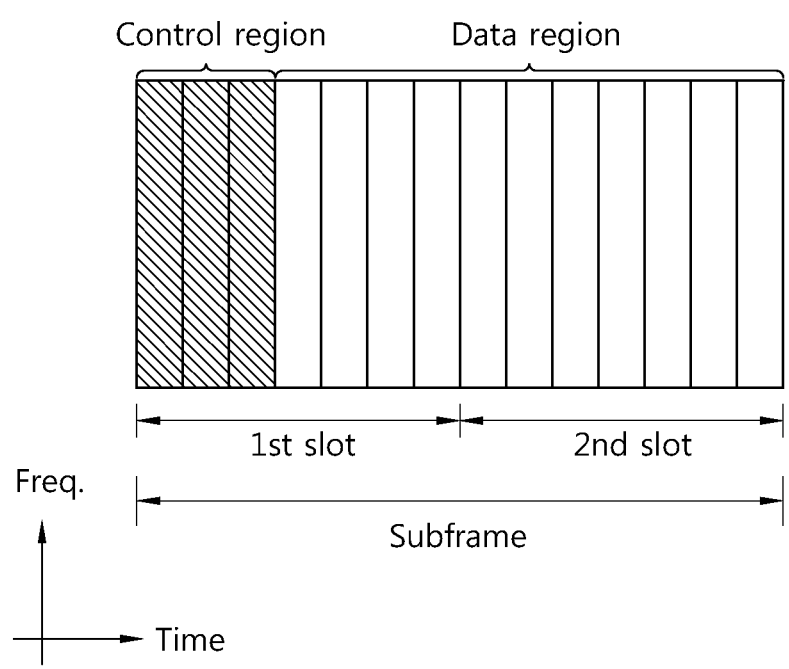
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. The user equipment does not transmit the PUCCH and the PUSCH simultaneously to maintain a single carrier property.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 6:
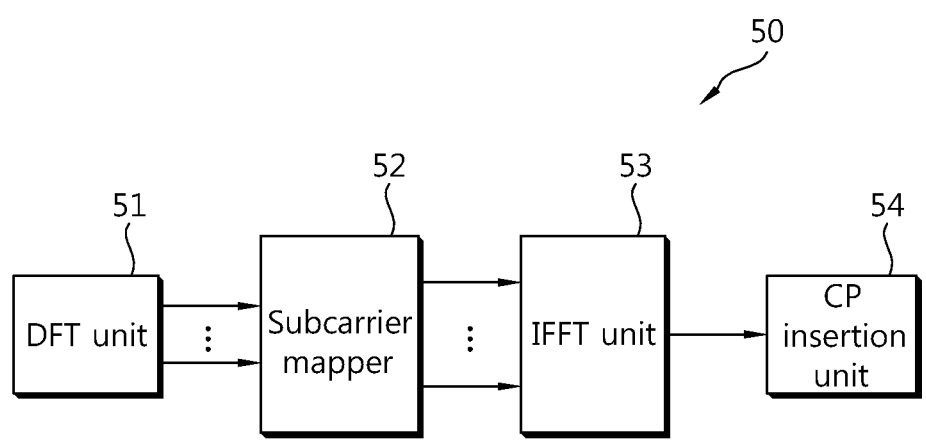
FIG. 6 shows an example of the structure of a transmitter in an SC-FDMA system.

FIG. 6 shows an example of the structure of a transmitter in an SC-FDMA system.

Referring to FIG. 6, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 7:
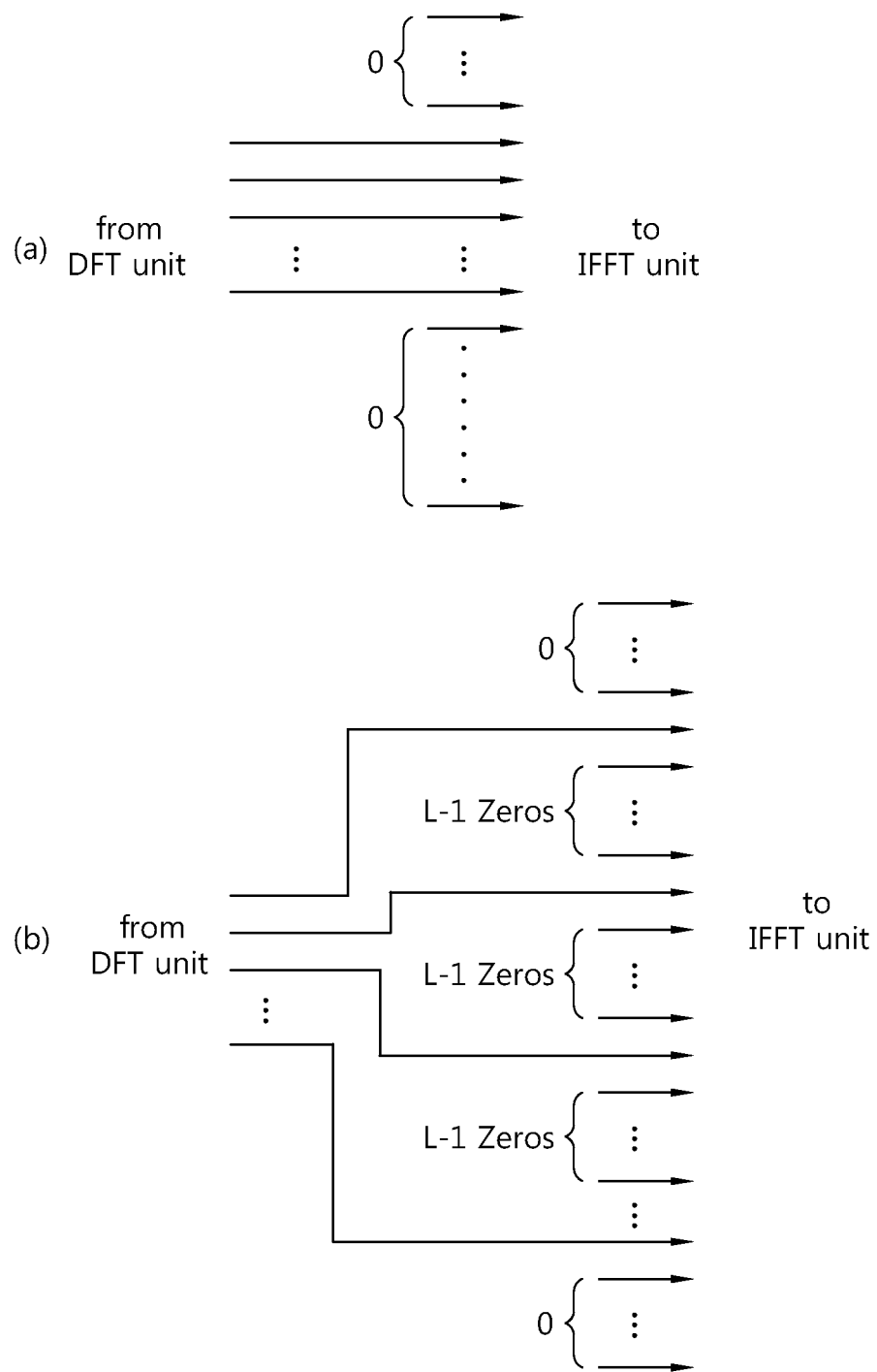
FIG. 7 shows an example of a scheme in which the subcarrier mapper maps the complex-valued symbols to the respective subcarriers of the frequency domain.

FIG. 7 shows an example of a scheme in which the subcarrier mapper maps the complex-valued symbols to the respective subcarriers of the frequency domain.

Referring to FIG. 7(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 7(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 7(a) or the distributed mapping scheme as in FIG. 10(b), a single carrier characteristic is maintained.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 8:
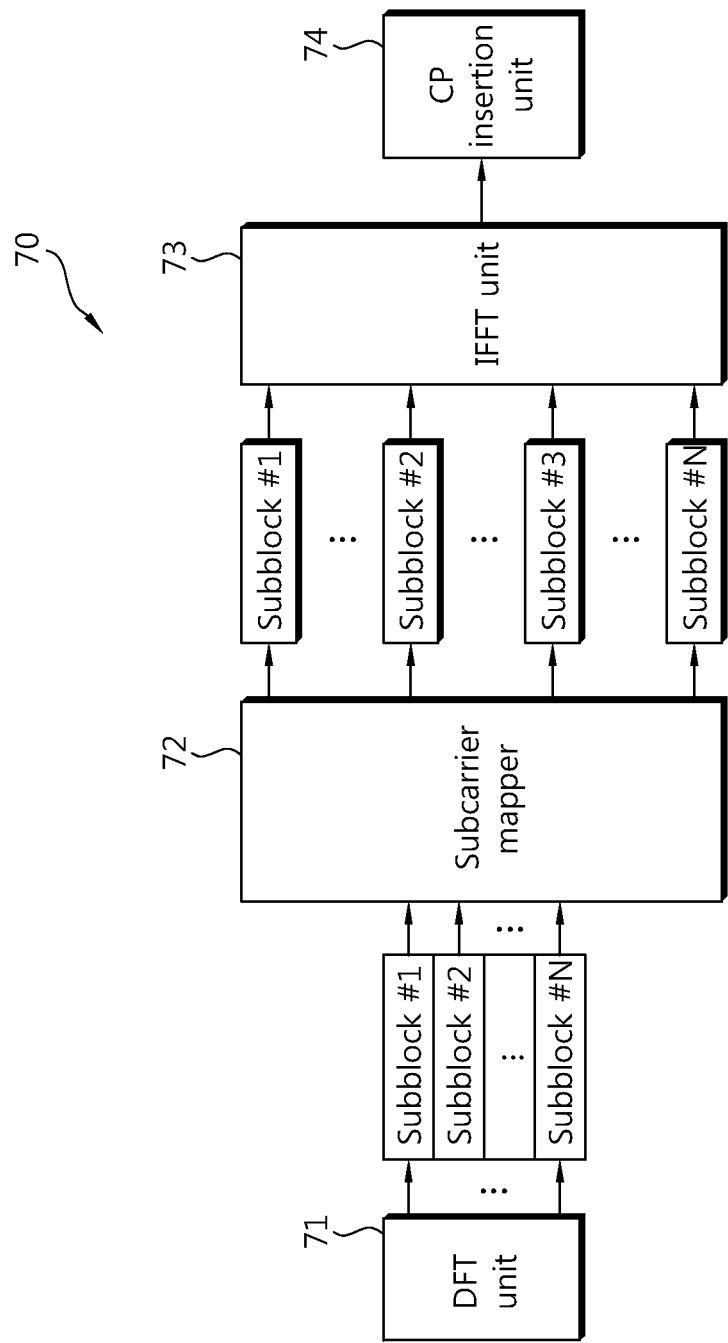
FIG. 8 shows an example of a transmitter using the clustered DFT-s OFDM transmission scheme.

FIG. 8 shows an example of a transmitter using the clustered DFT-s OFDM transmission scheme.

Referring to FIG. 8, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, ..., a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 8 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 8, a time domain signal is generated through one IFFT unit 73. Accordingly, in order for the transmitter 70 of FIG. 8 to be used in a multi-carrier transmitter, subcarrier intervals between contiguous carriers in a contiguous carrier allocation situation must be aligned.

Figure 9:
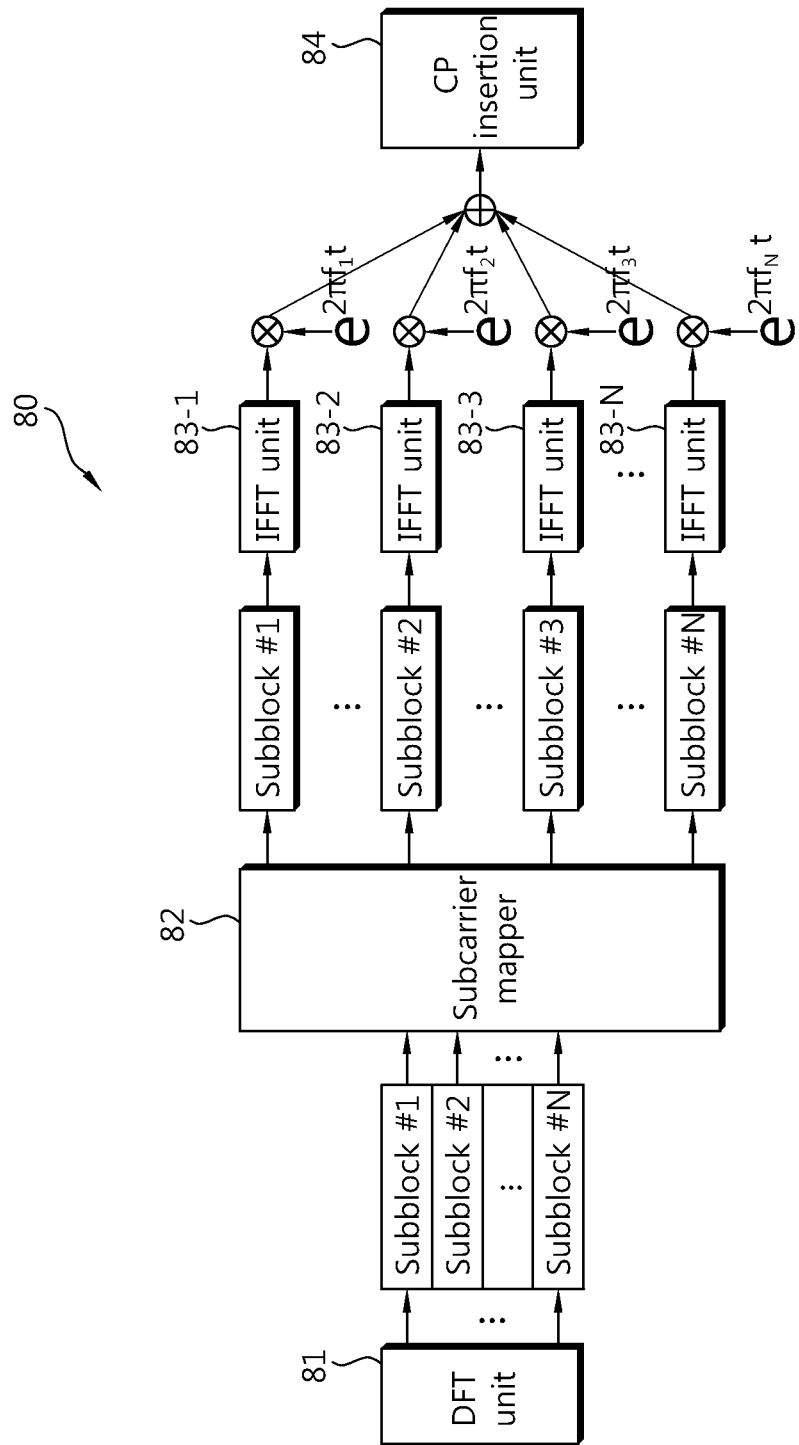
FIG. 9 shows another example of a transmitter using the clustered DFT-s OFDM transmission scheme.

FIG. 9 shows another example of a transmitter using the clustered DFT-s OFDM transmission scheme.

Referring to FIG. 9, the transmitter 80 includes a DFT unit 81, a subcarrier mapper 82, a plurality of IFFT units 83-1, 83-2, ..., 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-$n$ outputs an nth baseband signal (n=1, 2, ..., N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 9 may be used in a discontinuous carrier allocation situation where carriers allocated to the transmitter are not contiguous to each other.

Figure 10:
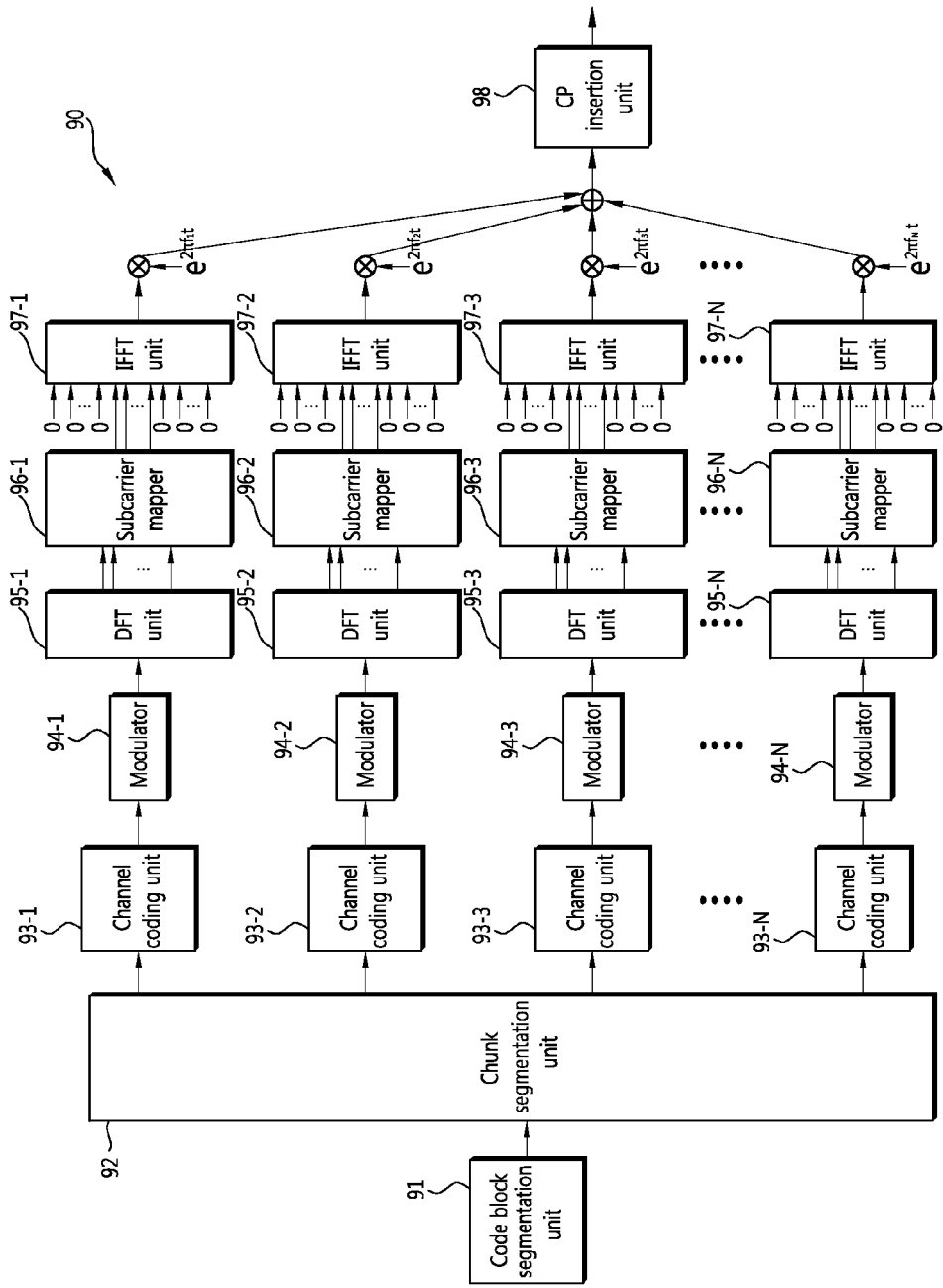
FIG. 10 shows another example of a transmitter using the clustered DFT-s OFDM transmission scheme.

FIG. 10 is another example of a transmitter using the clustered DFT-s OFDM transmission scheme.

FIG. 10 is a chunk-specific DFT-s OFDM system performing DFT precoding on a chunk basis. This may be called Nx SC-FDMA. Referring to FIG. 10, the transmitter 90 includes a code block division unit 91, a chunk division unit 92, a plurality of channel coding units 93-1, ..., 93-N, a plurality of modulators 94-1, ..., 94-N, a plurality of DFT units 95-1, ..., 95-N, a plurality of subcarrier mappers 96-1, ..., 96-N, a plurality of IFFT units 97-1, ..., 97-N, and a CP insertion unit 98. Here, N may be the number of multiple carriers used by a multi-carrier transmitter. Each of the channel coding units 93-1, ..., 93-N may include a scramble unit (not shown). The modulators 94-1, ..., 94-N may also be called modulation mappers. The transmitter 90 may further include a layer mapper (not shown) and a layer permutator (not shown) which may be placed in front of the DFT units 95-1, ..., 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be precoded and may be an antenna-specific reference signal.

A reference signal sequence $r_{u,v}^{(\alpha)}(n)$ may be defined based on a basic sequence $b_{u,v}(n)$ and a cyclic shift $\alpha$ according to Equation 1.

$$r_{u,v}^{(\alpha)}(n) = e^{j\alpha n} b_{u,v}(n), 0 \le n < M_{sc}^{RS} \qquad \text{<Equation 1>}$$

In Equation 1, $M_{sc}^{RS}$ ($1 \le m \le N_{RB}^{max,UL}$) is the length of the reference signal sequence and $M_{sc}^{RS} = m*N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value α from one basic sequence.

A basic sequence $b_{u,v}(n)$ is divided into a plurality of groups. Here, u□{0, 1, ..., 29} indicates a group index, and v indicates a basic sequence index within the group. The basic sequence depends on the length $M_{sc}^{RS}$ of the basic sequence. Each group includes a basic sequence (v=0) having a length of $M_{sc}^{RS}$ for m (1≤m≤5) and includes 2 basic sequences (v=0,1) having a length of $M_{sc}^{RS}$ for m (6≤m≤$n_{RB}^{max,UL}$). The sequence group index u and the basic sequence index v within a group may vary according to time as in group hopping or sequence hopping.

Furthermore, if the length of the reference signal sequence is $3N_{sc}"$ or higher, the basic sequence may be defined by Equation 2.

$$b_{u,v}(n) = x_q(n \bmod N_{ZC}^{RS}), 0 \le n < M_{sc}^{RS}$$ <Equation 2>

In Equation 2, q indicates a root index of a Zadoff-Chu (ZC) sequence. $N_{ZC}^{RS}$ is the length of the ZC sequence and may be a maximum prime number smaller than $M_{sc}^{RS}$.

The ZC sequence having the root index q may be defined by Equation 3.

$$x_q(m) = e^{-j\frac{\pi q m(m+1)}{N_{ZC}^{RS}}}, 0 \le m \le N_{ZC}^{RS} - 1$$ < Equation 3 > q may be given by Equation 4.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31$$ <Equation 4>

If the length of the reference signal sequence is $3N_{sc}^{RB}$ or less, the basic sequence may be defined by Equation 5.

$$b_{u,v}(n) = e^{j\phi(n)\pi/4}, 0 \le n \le M_{sc}^{RS} - 1$$ <Equation 5>

Table 1 is an example where $\phi(n)$ is defined when $M_{sc}^{RS} = N_{sc}^{RB}$.

Table 2 is an example where $\phi(n)$ is defined when $M_{sc}^{RS} = 2 \cdot N_{sc}^{RB}$.

TABLE 1

| | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of a reference signal may be applied as follows.

The sequence group index u of a slot index $n_s$ may be defined based on a group hopping pattern $f_{gh}(n_s)$ and a sequence shift pattern $f_{ss}$ according to Equation 6.

$$u=(f_{gh}(n_s)+f_{ss}) \bmod 30 \qquad \text{<Equation 6>}$$

17 different group hopping patterns and 30 different sequence shift patterns may exist. Whether to apply group hopping may be indicated by a higher layer.

A PUCCH and a PUSCH may have the same group hopping pattern. A group hopping pattern $f_{gh}(n_s)$ may be defined by Equation 7.

$$f_{gh}(n_s) = \begin{cases} 0 & \text{if group hopping is disabled} \\ \left(\sum_{i=0}^{7} c(8n_s+i) \cdot 2^i\right) \bmod 30 & \text{if group hopping is enabled} \end{cases} \qquad \text{<Equation 7>}$$

In Equation 7, c(i) is a pseudo random sequence that is a PN sequence and may be defined by a Gold sequence of a length-31. Equation 8 shows an example of a gold sequence c(n).

$$c(n)=(x_1(n+N_c)+x_2(n+N_c)) \bmod 2$$

$$x_1(n+31)=(x_1(n+3)+x_1(n)) \bmod 2$$

$$x_2(n+31)=(x_2(n+3)+x_2(n+2)+x_2(n+1)+x_1(n)) \bmod 2 \qquad \text{<Equation 8>}$$

Here, Nc=1600, $x_1(i)$ is a first m-sequence, and $x_2(i)$ is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be $f_{ss}^{PUCCH}=N_{ID}^{cell} \bmod 30$. The sequence shift pattern of the PUSCH may be $f_{ss}^{PUSCH}=(f_{ss}^{PUCCH}+\Delta_{ss}) \bmod 30$ and $\Delta_{ss} \in \{0, 1, \ldots, 29\}$ may be configured by a higher layer.

Sequence hopping may be applied to only a reference signal sequence having a length longer than $6N_{sc}^{RB}$. Here, a basic sequence index v within a basic sequence group of a slot index $n_s$ may be defined by Equation 9.

$$v = \begin{cases} c(n_s) & \text{if group hopping is disabled and sequence hopping in enabled} \\ 0 & \text{otherwise} \end{cases} \qquad \text{<Equation 9>}$$

c(i) may be represented by an example of Equation 8. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{SS}^{PUSCH}$$

in the first of each radio frame.

A DMRS sequence for a PUSCH may be defined by Equation 10.

$$r^{PUSCH}(m \cdot M_{sc}^{RS}+n)=r_{u,v}^{(\alpha)}(n) \qquad \text{<Equation 10>}$$

In Equation 10, m=0, 1, ... and n=0, ..., $M_{sc}^{RS}$-1. $M_{sc}^{RS}=M_{sc}^{PUSCH}$.

$\alpha=2\pi n_{cs}/12$, that is, a cyclic shift value is given within a slot, and $n_{cs}$ may be defined by Equation 11.

$$n_{cs}=(n_{DMRS}^{(1)}+n_{DMRS}^{(2)}+n_{PRS}(n_s)) \bmod 12 \qquad \text{<Equation 11>}$$

In Equation 11, $n_{DMRS}^{(1)}$ is indicated by a parameter transmitted by a higher layer, and Table 3 shows an example of a corresponding relationship between the parameter and $n_{DMRS}^{(1)}$.

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 11, $n_{DMRS}^{(2)}$ may be defined by a cyclic shift field within a DCI format 0 for a transmission block corresponding to PUSCH transmission. The DCI format is transmitted in a PDCCH. The cyclic shift field may have a length of 3 bits.

Table 4 shows an example of a corresponding relationship between the cyclic shift field and $n_{DMRS}^{(2)}$.

TABLE 4

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

Table 5 is another example of a corresponding relationship between the cyclic shift field and $n_{DMRS}^{(2)}$.

TABLE 5

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

If a PDCCH including the DCI format 0 is not transmitted in the same transmission block, if the first PUSCH is semi-persistently scheduled in the same transmission block, or if the first PUSCH is scheduled by a random access response grant in the same transmission block, $n_{DMRS}^{(2)}$ may be 0.

$n_{PRS}(n_s)$ may be defined by Equation 12.

$$n_{PRS}(n_s) = \Sigma_{i=0}^{7} c(8N_{symb}^{UL} \cdot n_s + i) \cdot 2^i \qquad \text{<Equation 12>}$$

c(i) may be represented by the example of Equation 8 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{SS}^{PUSCH}$$

in the first of each radio frame.

A DMRS sequence $r^{PUSCH}$ is multiplied by an amplitude scaling factor $\beta_{PUSCH}$ and mapped to a physical transmission block, used in relevant PUSCH transmission, from $r^{PUSCH}(0)$ in a sequence starting. The DMRS sequence is mapped to a fourth OFDM symbol (OFDM symbol index 3) in case of a normal CP within one slot and mapped to a third OFDM symbol (OFDM symbol index 2) within one slot in case of an extended CP.

Figure 11:
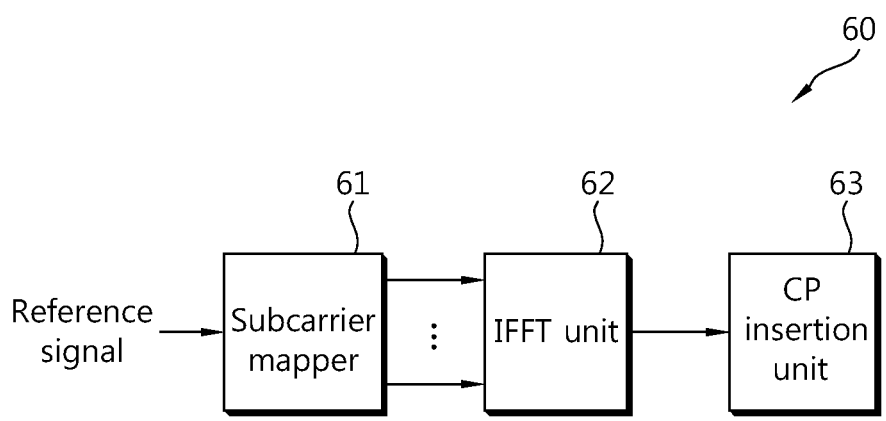
FIG. 11 shows an example of the structure of a reference signal transmitter for demodulation.

FIG. 11 shows an example of the structure of a reference signal transmitter for demodulation.

Referring to FIG. 11 the reference signal transmitter 60 includes a subcarrier mapper 61, an IFFT unit 62, and a CP insertion unit 63. Unlike the transmitter 50 of FIG. 6, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 7(a).

FIG. 12 shows examples of a subframe through which a reference signal is transmitted.

The structure of the subframe in FIG. 12(a) shows a case of a normal CP. The subframe includes a first slot and a second slot. Each of the first slot and the second slot includes 7 OFDM symbols. The 14 OFDM symbols within the subframe are assigned respective symbol indices 0 to 13. A reference signal may be transmitted through the OFDM symbols having the symbol indices 3 and 10. Data may be transmitted through the remaining OFDM symbols other than the OFDM symbols through which the reference signal is transmitted. The structure of a subframe in FIG. 12(b) shows a case of an extended CP. The subframe includes a first slot and a second slot. Each of the first slot and the second slot includes 6 OFDM symbols. The 12 OFDM symbols within the subframe are assigned symbol indices 0 to 11. A reference signal is transmitted through the OFDM symbols having the symbol indices 2 and 8. Data is transmitted through the remaining OFDM symbols other than the OFDM symbols through which the reference signal is transmitted. Even though it is not shown in FIG. 12, a sounding reference signal (SRS) may be transmitted through OFDM symbols in the subframe.

Figure 13:
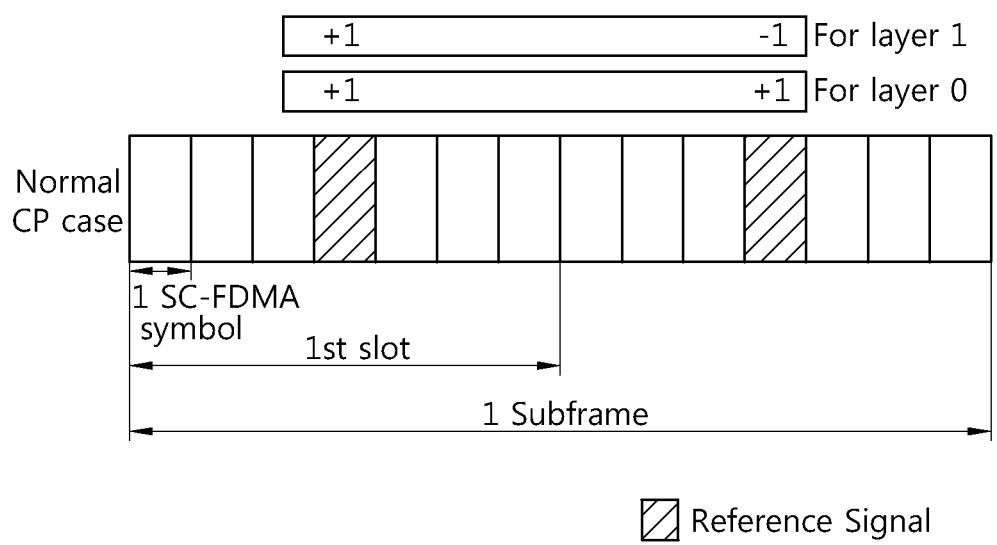
FIG. 13 shows an example in which an OCC is applied to a reference signal.

FIG. 13 shows an example in which an OCC is applied to a reference signal.

In one subframe, both of a reference signal sequence for a layer 0 and a reference signal sequence for a layer 1 are mapped to a $4^{th}$ OFDM symbol of a $1^{st}$ slot and a $4^{th}$ OFDM symbol of a $2^{nd}$ slot. In each layer, the same sequence is mapped to two OFDM symbols. In this case, the reference signal sequence for the layer 0 is multiplied by an orthogonal sequence [+1 +1] and is then mapped to an OFDM symbol. The reference signal sequence for the layer 1 is multiplied by an orthogonal sequence [+1 −1] and is then mapped to an OFDM symbol. That is, when the reference signal sequence for the layer 1 is mapped to a $2^{nd}$ slot in one subframe, it is mapped by multiplying −1.

When the OCC is applied as described above, a BS which receives a reference signal can estimate a channel of the layer 0 by adding a reference signal sequence transmitted in the $1^{st}$ slot and a reference signal sequence transmitted in the $2^{nd}$ slot. In addition, the BS can estimate a channel of the layer 1 by subtracting the reference signal sequence transmitted in the $2^{nd}$ slot from the reference signal sequence transmitted in the $1^{st}$ slot. That is, by applying the OCC, the BS can identify a reference signal transmitted in each layer. Therefore, a plurality of reference signals can be transmitted by using the same resource. If the number of available cyclic shift values is 6, the number of users or the number of layers that can be multiplexed by using the OCC can be increased to up to 12.

Although it is assumed in this example that a binary format of [+1 +1] or [+1 −1] is used as the OCC, the present invention is not limited thereto, and thus various types of orthogonal sequences can be used as the OCC. For example, an orthogonal sequence such as a Walsh code, discrete Fourier transform (DFT) coefficients and a CAZAC sequence may be applied to the OCC.

In addition, by applying the OCC, a reference signal can be multiplexed in an easier manner between users having different bandwidths.

Figure 14:
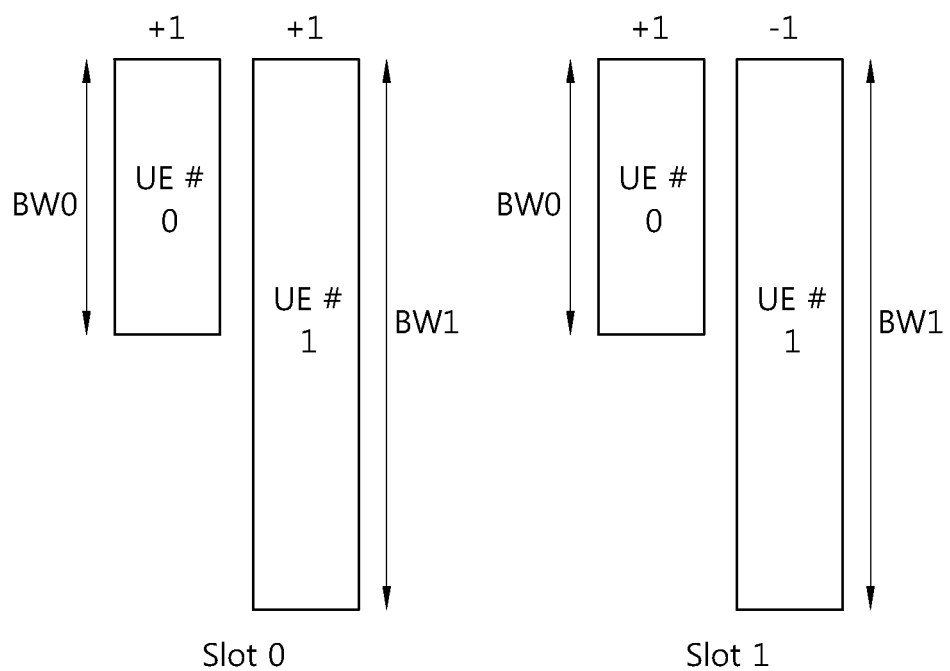
FIG. 14 shows an example of multiplexing a reference signal transmitted from two UEs having different bandwidths by applying an OCC.

FIG. 14 shows an example of multiplexing a reference signal transmitted from two UEs having different bandwidths by applying an OCC.

Each of a $1^{st}$ UE and a $2^{nd}$ UE transmits a reference signal by using a different bandwidth. The $1^{st}$ UE (or UE #0) transmits a reference signal through a $1^{st}$ bandwidth (or BW0), and the $2^{nd}$ UE (or UE #1) transmits a reference signal through a $2^{nd}$ bandwidth (or BW1). The reference signal transmitted by the $1^{st}$ TIE is multiplied by an orthogonal sequence [+1 +1] in each of a $1^{st}$ slot and a $2^{nd}$ slot. The reference signal transmitted by the $2^{nd}$ UE is multiplied by an orthogonal sequence [+1 −1] in each of the $1^{st}$ slot and the $2^{nd}$ slot. Accordingly, a BS which receives the reference signal from the $1^{st}$ UE and the $2^{nd}$ UE can perform channel estimation by identifying each of the two UEs.

Hereinafter, multiple-input multiple-output (MIMO) will be described. A MIMO method can be divided into two methods, i.e., per-antenna rate control (PARC) and per-user unitary rate control (PU2RC).

Figure 15:
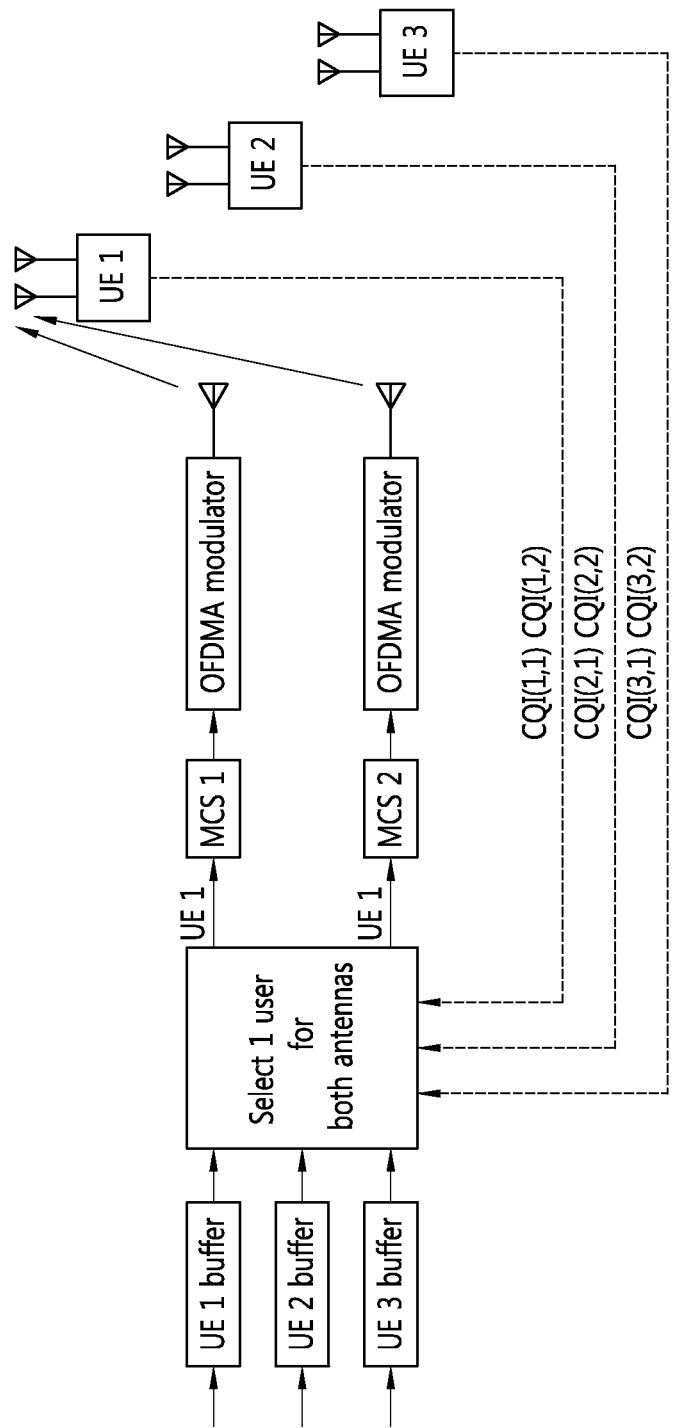
FIG. 15 shows an example of a PARC method.

FIG. 15 shows an example of a PARC method.

PARC is a method for performing MIMO by using spatial multiplexing. According to the PARC method, spatial resources can be allocated to one TIE or a plurality of UEs. When the spatial resources are allocated to one UE, it is called single-user (SU) MIMO. When the spatial resources are allocated to a plurality of UEs, it is called multi-user (MU) MIMO.

The example of FIG. 15 is a case where a PARC method is applied to SU-MIMO. When assuming 3 UEs, a BS selects one UE to which a plurality of antennas transmit data among the three 3 UEs. When a $1^{st}$ UE is selected, a modulation and coding scheme (MCS) level for each of the plurality of antennas is determined, and data is transmitted to the $1^{st}$ UE through the plurality of antennas by using an OFDMA modulator. The UEs respectively transmit channel quality indicators (CQIs) for the plurality of antennas of the corresponding UE to the BS.

Figure 16:
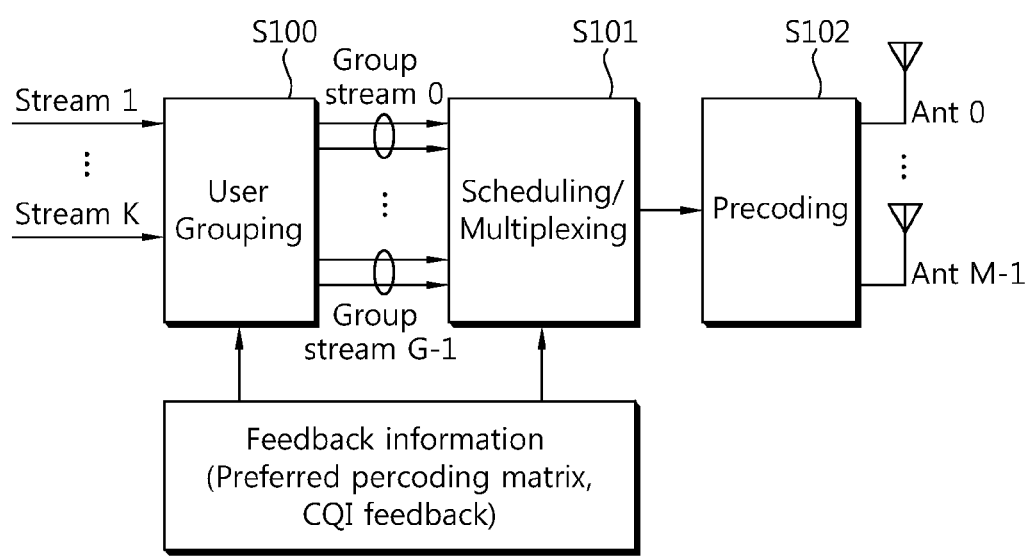
FIG. 16 shows an example of a PU2RC method.

FIG. 16 shows an example of a PU2RC method.

In PU2RC, multi-user interference is decreased by precoding data on the basis of a codebook. A BS performs grouping on a plurality of UEs to generate a plurality of group streams (step S100). The BS performs scheduling and multiplexing on the generated group stream (step S101). The BS performs precoding on each group stream by using a precoding matrix corresponding to each group (step S102), and transmits it through a plurality of antennas. When performing precoding, unitary codebook-based precoding can be used. Each UE feeds back a preferred precoding matrix, a transmit antenna, and a CQI corresponding to each transmit antenna to the BS. The BS can use feedback information when performing scheduling. As such, since the multi-user interference can be decreased by performing MIMO by the use of the precoding, a high performance gain can be obtained in a MU-MIMO environment.

A wireless communication system can support a UL or DL HARQ.

Figure 17:
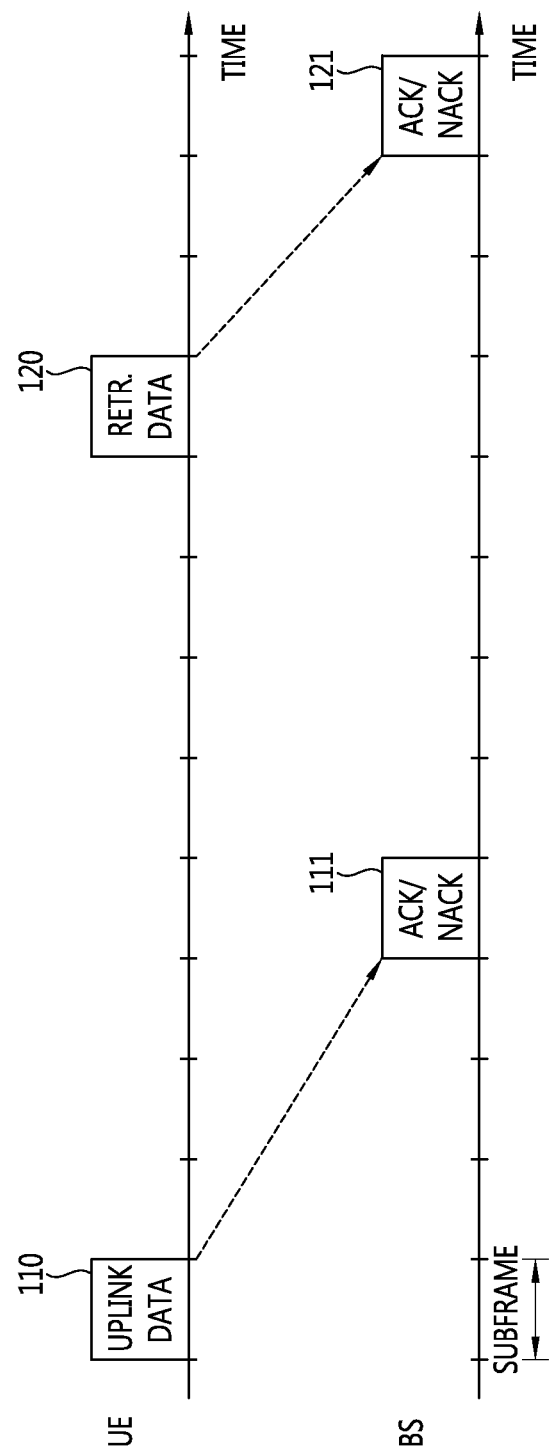
FIG. 17 shows a UL HARQ.

FIG. 17 shows a UL HARQ.

A BS receives UL data 110 from a UE through a PUSCH, and after a specific subframe elapses, transmits an ACK/NACK signal 111 through a PHICH. The ACK/NACK signal 111 corresponds to an ACK signal when the UL data 110 is successfully decoded, and corresponds to a NACK signal when the UL data 110 fails in decoding. Upon receiving the NACK signal, the UE can transmit retransmission data 120 for the UL data 110 until ACK information is received or until retransmission is performed up to a maximum number of retransmission attempts. The BS can transmit an ACK/NACK signal 121 for the retransmission data 120 through the PHICH.

The following description is about the PHICH.

Figure 18:
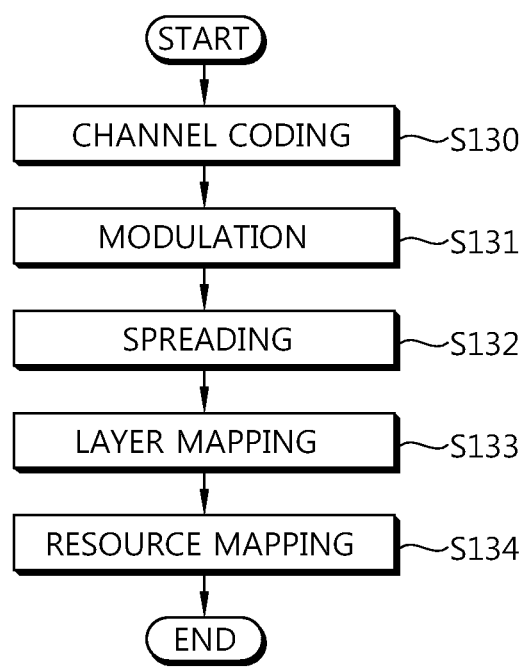
FIG. 18 is a flowchart showing transmission of an ACK/NACK signal through a PHICH.

FIG. 18 is a flowchart showing transmission of an ACK/NACK signal through a PERCH.

Since an LTE system does not support SU-MIMO in an uplink, one PHICH carries only 1-bit ACK/NACK corresponding to a PUSCH for one UE, that is, corresponding to a single stream. In step S130, the 1-bit ACK/NACK is coded into 3 bits by using a repetition code having a code rate of ⅓. In step S131, the coded ACK/NACK is modulated using binary phase shift keying (BPSK) to generate 3 modulation symbols. In step S132, the modulation symbols are spread by using a spreading factor (SF) of 4 in a normal CP structure and by using an SF of 2 in an extended CP structure. An orthogonal sequence is used when spreading the modulation symbols, and the number of orthogonal sequences used in the spreading is SF×2 to apply UQ multiplexing. PHICHs which are spread by using SF×2 orthogonal sequences can be defined as one PHICH group. In step S133, layer mapping is performed on the spread symbols. In step S124, the layer-mapped symbols are transmitted by being mapped to resources.

The PHICH carries HARQ ACK/NACK depending on PUSCH transmission. A plurality of PHICHs mapped to resource elements of the same set constitutes a PHICH group. Each PHICH in the PHICH group is identified by a different orthogonal sequence. In the FDD system, $N_{PHICH}^{group}$, i.e., the number of PHICH groups, is constant in all subframes, and can be determined by Equation 13 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad <\text{Equation 13}>$$

In Equation 13, $N_g$ is transmitted in a higher layer through a physical broadcast channel (PBCH), where $N_g \in \{⅙, ½, 1, 2\}$. The PBCH carries essential system information when a UE communicates with a BS. The system information transmitted through the PBCH is called a master information block (MIB). In comparison, system information transmitted through a physical downlink control channel (PDCCH) is called a system information block (SIB). $N_{RB}^{DL}$ denotes a DL bandwidth configuration expressed with a multiple of $N_{sc}^{RB}$ which is an RB size in a frequency domain. A PHICH group index $n_{PHICH}^{group}$ is any one integer from 0 to $N_{PHICH}^{group} - 1$.

A resource used in the MUCH can be determined based on a lowest physical resource block (PRB) index in resource allocation of the PUSCH and a cyclic shift (CS) value of a demodulation reference signal (DMRS) transmitted using a UL grant. A resource to which the PHICH is mapped (hereinafter, a PHICH resource) can be expressed by an index pair $(n_{PHICH}^{group}, n_{PHICH}^{seq})$. Herein, $n_{PHICH}^{group}$ denotes a PHICH group index, and $n_{PHICH}^{seq}$ denotes an orthogonal sequence index in the PHICH group. The index pair $(n_{PHICH}^{group}, n_{PHICH}^{seq})$ can be determined by Equation 14 below.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH} \quad <\text{Equation 14}>$$

$n_{DMRS}$ can be determined based on a "cyclic shift for DMRS" field in a DCI format 0 according to Table 6

TABLE 6

| Cyclic Shift for DMRS Field in DCI format 0 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In addition, in a case where a PDCCH including the DCI format 0 is not transmitted in the same transport block, $n_{DMRS}$ may be 0 if a first PUSCH is semi-persistently scheduled in the same transport block or if the first PUSCH is scheduled in the same transport block by a random access response grant.

Returning to Equation 14, $N_{SF}^{PHICH}$ denotes a spreading factor (SF) used in PHICH modulation. $I_{PRB\_RA}^{lowest\_index}$ is a lowest PRB index among PRBs of a slot in which a PUSCH corresponding to a PHICH is transmitted. $I_{PHICH}$ has a value of 0 or 1.

An orthogonal sequence used in the PHICH can be determined by Table 7. The orthogonal sequence in use may vary depending on a value $n_{PHICH}^{seq}$ or a CP structure.

TABLE 7

| Sequence Index ($n_{PHICH}^{seq}$) | Orthogonal Sequence | |
|---|---|---|
| | Normal CP ($N_{SF}^{PHICH}$ = 4) | Extended CP ($N_{SF}^{PHICH}$ = 2) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The plurality of PHICHs can be simultaneously allocated. In particular, the plurality of PHICHs can be allocated in a system such as a carrier aggregation system, MU-MIMO, a cooperative multi-point (CoMP) transmission scheme, etc.

Figure 19:
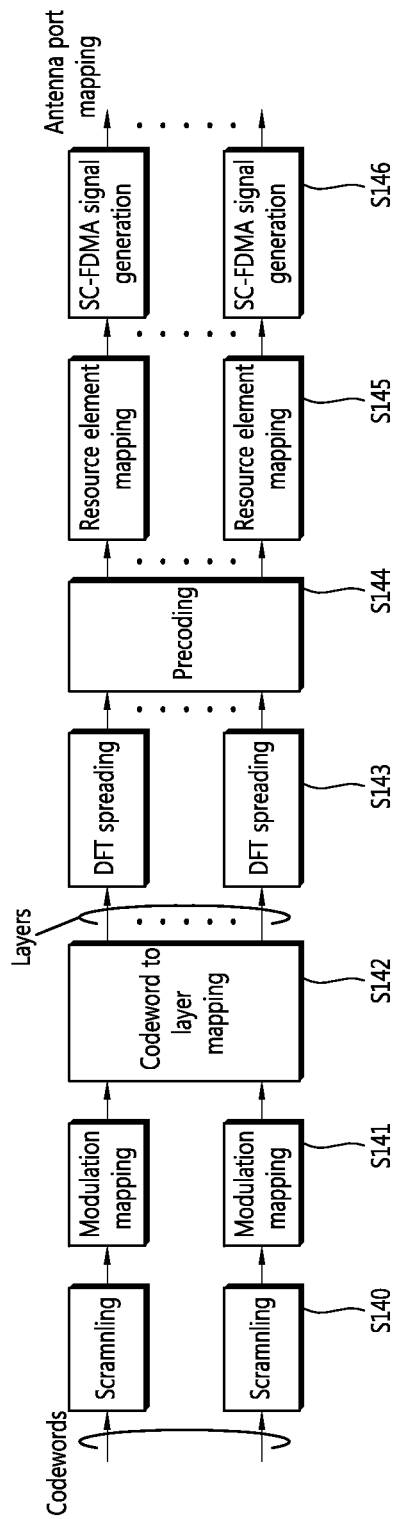
FIG. 19 is a block diagram showing a MIMO transmission process in an uplink to which an SC-FDMA transmission method is applied.

FIG. 19 is a block diagram showing a MIMO transmission process in an uplink to which an SC-FDMA transmission method is applied.

In order to perform MIMO transmission, a plurality of codewords can be used. If it is assumed that the number of codewords is 2, each codeword is scrambled in step S140, the codeword is mapped to a modulation symbol in step S141, and the symbols are mapped to respective layers in step S142. Each of the layers is DFT-spread in step S143, and is precoded in step S144. A stream generated by being precoded is mapped in step S145, and is transmitted through each antenna by using an SC-FDMA signal generator in step S146. To facilitate HARQ for an uplink, two independent ACK/NACK signals are required for the respective codewords.

Figure 20:
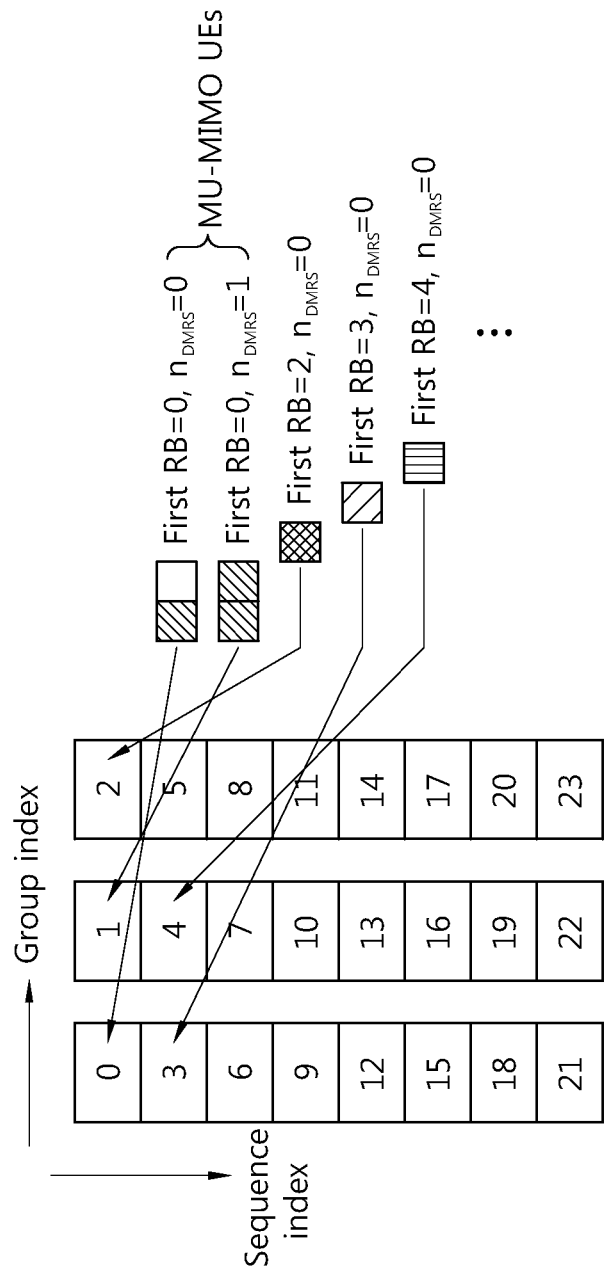
FIG. 20 shows an example in which PHICH resources are allocated.

FIG. 20 shows an example in which PHICH resources are allocated.

In FIG. 20, a horizontal axis indicates PHICH group indices, and a vertical axis indicates orthogonal sequence indices within PHICH groups. Relevant PHICH resources are determined depending on the smallest PRB index to which a PUSCH is allocated and a value $n_{DMRS}$ in each UE. For example, PHICH resources may be determined according to Equation 23. PHICH resources for a maximum of 8 users may be distinguished from each other based on the value $n_{DMRS}$ in an MU-MIMO environment. Accordingly, when a plurality of PHICHs is transmitted, PHICH resources can be prevented from colliding with each other.

PHICH resources corresponding to two PUSCHs transmitted through two antennas in first UE are allocated to a resource element #0, that is, indices (0,0), and a resource element #1, that is, indices (1,0). Here, the smallest PRB indices in which the PUSCHs are transmitted are the same, but the values $n_{DMRS}$ may differ. Furthermore, PHICH resources corresponding to a PUSCH transmitted in second UE are allocated to a resource element #2, that is, indices (2,0). Likewise, PHICH resources corresponding to respective PUSCHs transmitted in a third UE and a fourth UE are allocated to a resource element #3, that is, indices (0,1), and a resource element #4, that is, indices (1,1).

If data is multiplexed using OCCs, however, a plurality of data or a plurality of reference signals may be transmitted using the same resources by applying OCCs having the same smallest PRB index and the same value $n_{DMRS}$, but having different OCCs. Here, a plurality of PHICHs uses the same resources according to Equation 14, and thus PHICH resources collide with each other. Accordingly, there is a need for a method of preventing PHICH resources from colliding with each other when a plurality of PHICHs is allocated.

A method of solving the collision problem of PHICH resources is described below. The present invention proposes a method of allocating a cyclic shift value for a DMRS to a plurality of antennas within each TIE in order to prevent PHICH resources, used for each UE to transmit an ACK/NACK signal, from colliding each other in an uplink MU-MIMO environment.

As described in Equation 14, PHICH resources may be allocated according to Equation 15.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$ <Equation 15>

In case of an extended CP format, $2N_{SF}^{PHICH}=4$. Assuming that $N_{PHICH}^{group}=4$, when $n_{DMRS}=0$ and $n_{DMRS}4$, $n_{PHICH}^{group}$ and $n_{PHICH}^{seq}$ indicating a position where PHICH resources are allocated may become identical with each other. That is, even when different values $n_{DMRS}$ are allocated, PHICH resources may collide with each other. For example, if first UE uses $n_{DMRS}=0$ and second UE uses $n_{DMRS}=4$, PHICH resources may collide with each other. Furthermore, even when the values $n_{DMRS}$ allocated to respective UEs are 1 and 5, 2 and 6, or 3 and 7, PHICH resources may collide with each other. Here, if each UE has a single antenna, the scheduler of a BS may flexibly allocate the cyclic shift value of a DMRS on the DCI format 0 so that the PHICH resources do not collide with each other. If each UE has a plurality of antennas, however, there is a need for a method of reducing a probability that PERCH resources between UEs may collide with each other because a different cyclic shift value needs to be allocated to each UE and a different cyclic shift value needs to be allocated to each antenna within one UE.

Accordingly, the present invention proposes a method of preventing a collision between PHICH resources for a plurality of UEs by allocating a cyclic shift value through which the PHICH resources may collide with each other to each layer when allocating the cyclic shift value to each of a plurality of layers within one UE. That is, there is proposed a method of reducing a probability that PHICH resources between a plurality of UEs may collide with each other by allocating, for example, the above-described $n_{DMRS}=0$ and $n_{DMRS}=4$ to each of a plurality of layers within one UE.

The present invention is described in connection with various embodiments. In the following description, different cyclic shift values are allocated to a plurality of layers, but different cyclic shift values may be allocated to a plurality of antennas. Furthermore, different cyclic shift values allocated to a plurality of layers may be implicitly allocated based on the cyclic shift value of a DMRS transmitted through the DCI format 0. In the following description, the cyclic shift value of the DMRS transmitted through the DCI format 0 is set to $n_{DMRS}=A$.

First, an example in which the present invention is applied when an ACK/NACK signal for a single codeword or a plurality of codewords is transmitted on one PHICH is described.

Different cyclic shift values may be allocated to respective UEs that perform uplink MU-MIMO transmission.

Figure 21:
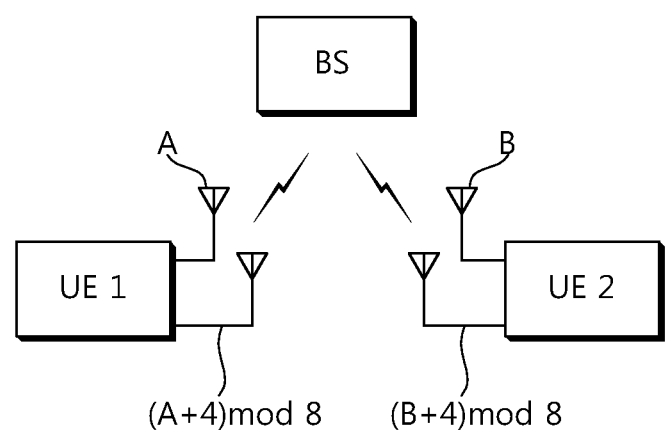
FIG. 21 shows an example in which cyclic shift values for two UEs according to a proposed method of performing an HARQ are allocated.

FIG. 21 shows an example in which cyclic shift values for two UEs according to a proposed method of performing an HARQ are allocated. FIG. 21 shows an example in which each UE has two transmit antennas and performs rank-2 transmission. That is, two different cyclic shift values are necessary for each UE.

Referring to FIG. 21, A and (A+4)mod 8, that is, respective cyclic shift values, are allocated to the two layers of first UE UE 1. Furthermore, B and (B+4)mod 8, that is, respective cyclic shift values, are allocated to the two layers of second UE UE 2. A is a cyclic shift value of a DMRS transmitted on the DCI format 0, and it may have any one of values 0 to 7. B is a different value from A and (A+4)mod 8, and it may have any one of values 0 to 7 like A. For example, 0 and 4, that is, cyclic shift values for the respective antennas of the first UE, may be allocated, and 1 and 5, that is, cyclic shift values for the respective antennas of the second UE may be allocated. Accordingly, a probability that PHICH resources between UEs collide with each other can be reduced. Furthermore, cyclic shift values allocated to respective layers within each UE or order of the cyclic shift values allocated between UEs may be changed. For example, (A+4)mod 8, that is, a cyclic shift value, may be allocated to the first layer of the first UE, and A, that is, a cyclic shift value, may be allocated to the second layer of the first UE.

Furthermore, if each UE has two transmit antennas and performs rank-2 transmission, cyclic shift values according to the present invention may be allocated to four UEs. Two different cyclic shift values are necessary for each UE because each UE performs rank-2 transmission. Table 8 shows an example in which cyclic shift values are allocated to two layers within each of four UEs.

TABLE 8

|  | First UE | Second UE | Third UE | Fourth UE |
| --- | --- | --- | --- | --- |
| First layer | A | B | C | D |
| Second layer | (A + 4)mod8 | (B + 4)mod8 | (C + 4)mod8 | (D + 4)mod8 |

A is a cyclic shift value of a DMRS transmitted on the DCI format 0, and it may have any one of values 0 to 7. B is a value different from A and (A+4)mod 8, and it may have any one of values 0 to 7 like A. C is a value different from A, (A+4)mod 8, B, and (B+4)mod 8, and it may have any one of values 0 to 7. D is a value different from A, (A+4)mod 8, B, (B+4)mod 8, C, and (C+4)mod 8, and it may have any one of values 0 to 7. Furthermore, a cyclic shift value allocated to each layer within each UE or order of cyclic shift values allocated between UEs may be changed.

Furthermore, if each UE has four transmit antennas and performs rank-4 transmission, the cyclic shift values according to the present invention may be allocated to two UEs. Different four cyclic shift values are necessary for each UE because each UE performs rank-4 transmission. Each of Table 9 and Table 10 shows an example in which cyclic shift values are allocated to four layers within two UEs, respectively.

TABLE 9

|  | First UE | Second UE | First UE | Second UE |
| --- | --- | --- | --- | --- |
| First layer | A | C | A | C |
| Second layer | (A + 4)mod8 | (C + 4)mod8 | B | D |
| Third layer | B | D | (A + 4)mod8 | (C + 4)mod8 |
| Fourth layer | (B + 4)mod8 | (D + 4)mod8 | (B + 4)mod8 | (D + 4)mod8 |

TABLE 10

|  | First UE | Second UE | First UE | Second UE |
| --- | --- | --- | --- | --- |
| First layer | A | B | A | B |
| Second layer | (A + 2)mod8 | (B + 2)mod8 | (A + 4)mod8 | (B + 4)mod8 |
| Third layer | (A + 4)mod8 | (B + 4)mod8 | (A + 2)mod8 | (B + 2)mod8 |
| Fourth layer | (A + 6)mod8 | (B + 6)mod8 | (A + 6)mod8 | (B + 6)mod8 |

A is a cyclic shift value of a DMRS transmitted on the DCI format 0, and it may have any one of values 0 to 7. B is a value different from A and (A+4)mod 8, and it may have any one of values 0 to 7 like A. C is a value different from A, (A+4)mod 8, B, and (B+4)mod 8, and it may have any one of values 0 to 7. D is a value different from A, (A+4)mod 8, B, (B+4)mod 8, C, and (C+4)mod 8, and it may have any one of values 0 to 7. Furthermore, cyclic shift values allocated to respective layers within each UE or order of the cyclic shift values allocated between UEs may be changed.

Furthermore, if each HE has four transmit antennas and performs rank-4 transmission, the cyclic shift values according to the present invention may be allocated to four UEs. Four different cyclic shift values are necessary for each UE because each UE performs rank-4 transmission. Each of Table 11 and Table 12 shows an example in which cyclic shift values are allocated to four layers within each of four UEs.

TABLE 11

|  | First UE | Second UE | Third UE | Fourth UE |
| --- | --- | --- | --- | --- |
| First layer | A | A | C | D |
| Second layer | (A + 2)mod8 | (B + 2)mod8 | (C + 2)mod8 | (D + 2)mod8 |
| Third layer | (A + 4)mod8 | (B + 4)mod8 | (C + 4)mod8 | (D + 4)mod8 |
| Fourth layer | (A + 6)mod8 | (B + 6)mod8 | (C + 6)mod8 | (D + 6)mod8 |

TABLE 12

|  | First UE | Second UE | Third UE | Fourth UE |
| --- | --- | --- | --- | --- |
| First layer | A | A | C | D |
| Second layer | (A + 4)mod8 | (B + 4)mod8 | (C + 4)mod8 | (D + 4)mod8 |
| Third layer | (A + 2)mod8 | (B + 2)mod8 | (C + 2)mod8 | (D + 2)mod8 |
| Fourth layer | (A + 6)mod8 | (B + 6)mod8 | (C + 6)mod8 | (D + 6)mod8 |

A is a cyclic shift value of a DMRS transmitted on the DCI format 0, and it may have any one of values 0 to 7. B is a value different from A and (A+4)mod 8, and it may have any one of values 0 to 7 like A. C is a value different from A, (A+4)mod 8, B, and (B+4)mod 8, and it may have any one of values 0 to 7. D is a value different from A, (A+4)mod 8, B, (B+4)mod 8, C, and (C+4)mod 8, and it may have any one of values 0 to 7. Furthermore, cyclic shift values allocated to respective layers within each UE or order of the cyclic shift values allocated between UEs may be changed.

As an alternative, the same cyclic shift value may be allocated to UEs that perform uplink MU-MIMO transmission, but the UEs may be distinguished from each other by using different OCC indices for the multiplexing of reference signals.

Equation 16 shows an example of an equation for allocating PHICH resources using OCC indices.

$$n_{PHICH}^{group} = (I_{PRB\_RA}^{lowest-index} + n_{DMRS} + n_{OCC}) \bmod N_{PHICH}^{group} + I_{PHICH} N_{PHICH}^{group}$$

$$n_{PHICH}^{seq} = (\lfloor I_{PRB\_RA}^{lowest-index} / N_{PHICH}^{group} \rfloor + n_{DMRS} + n_{OCC}) \bmod 2N_{SF}^{PHICH}$$
<Equation 16>

In Equation 16, $n_{OCC}$ indicating an OCC index may have a length of a maximum 3 bits. That is, in an MU-MIMO transmission environment, a maximum number of UEs that may be distinguished from each other based on OCC indices is 8. In the following description, it is assumed that $n_{OCC}$ has a length of 1 bit and has any one of values 0 and 1. Furthermore, it is assumed that a DMRS is transmitted in two SC-FDMA symbols within a subframe.

Figure 22:
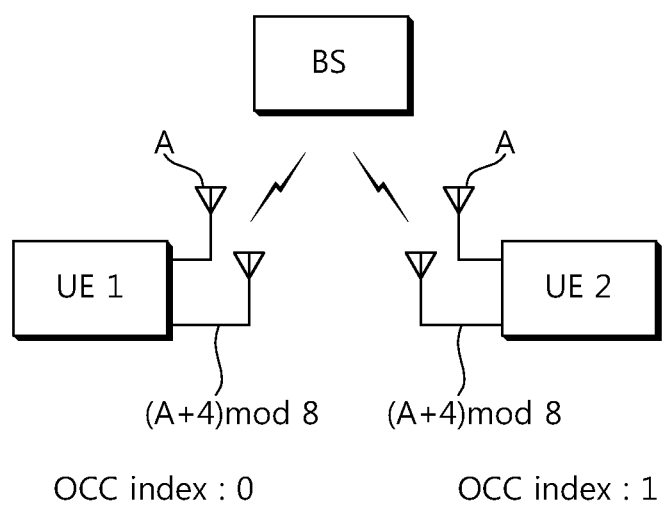
FIG. 22 shows an example in which cyclic shift values for two UEs according to a proposed method of performing an HARQ are allocated.

FIG. 22 shows an example in which cyclic shift values for two UEs according to a proposed method of performing an HARQ are allocated. FIG. 22 shows an example in which each UE has two transmit antennas and performs rank-2 transmission.

Referring to FIG. 22, A and (A+4)mod 8, that is, respective cyclic shift values, are allocated to the two layers of first UE UE 1. Likewise, A and (A+4)mod 8, that is, respective cyclic shift values, are allocated to the two layers of second UE UE 2. Here, different OCC indices 0 and 1 are allocated to the first UE and the second UE. Accordingly, the first UE and the second UE can be distinguished from each other. A is a cyclic shift value of a DMRS transmitted on the DCI format 0, and it may have any one of values 0 to 7. Accordingly, a probability that PHICH resources between UEs collide with each other can be reduced. Furthermore, cyclic shift values allocated to respective layers within each UE or order of the cyclic shift values allocated between UEs may be changed. For example, (A+4)mod 8, that is, a cyclic shift value may be allocated to the first layer of the first UE, and A, that is, the cyclic shift value may be allocated to the second layer of the first UE.

Furthermore, if each UE has two transmit antennas and performs rank-2 transmission, cyclic shift values according to the present invention may be allocated to four UEs. Table 13 shows an example in which cyclic shift values are allocated to the two layers of each of four UEs.

TABLE 13

|  | First UE | Second UE | Third UE | Fourth UE |
| --- | --- | --- | --- | --- |
| First layer | A | B | A | B |
| Second layer | (A + 4)mod8 | (B + 4)mod8 | (A + 4)mod8 | (B + 4)mod8 |
| OCC index | 0 | 1 | 0 | 1 |

A is a cyclic shift value of a DMRS transmitted on the DCI format 0, and it may have any one of values 0 to 7. B is a value different from A and (A+4)mod 8, and it may have any one of values 0 to 7 like A. Cyclic shift values allocated to respective layers within each UE or order of the cyclic shift values allocated between UEs may be changed. Furthermore, the OCC index may be changed within UE to which the same cyclic shift value is allocated.

In Table 13, an example in which the OCC index has a length of 1 bit and any one of values 0 and 1 is assumed, but the length of the OCC index may be increased up to a maximum of 3 bits. If the OCC index is 2 bits, OCC indices 0 to 3 may be allocated to the first UE to the fourth UE. Table 14 shows another example in which cyclic shift values are allocated to two layers within each of four UEs.

TABLE 14

|  | First UE | Second UE | Third UE | Fourth UE |
| --- | --- | --- | --- | --- |
| First layer | A | A | A | A |
| Second layer | (A + 4)mod8 | (A + 4)mod8 | (A + 4)mod8 | (A + 4)mod8 |
| OCC index | 0 | 1 | 2 | 3 |

A is a cyclic shift value of a DMRS transmitted on the DCI format 0, and it may have any one of values 0 to 7. Furthermore, cyclic shift values allocated to respective layers within each UE or order of the cyclic shift values allocated between UEs may be changed. Furthermore, the OCC index may be changed within UE to which the same cyclic shift value is allocated.

Furthermore, if each UE has four transmit antennas and performs rank-4 transmission, the cyclic shift values according to the present invention may be allocated to two UEs. Table 15 shows an example in which cyclic shift values are allocated to four layers within each of two UEs.

TABLE 15

|  | First UE | Second UE |
| --- | --- | --- |
| First layer | A | A |
| Second layer | (A + 2)mod8 | (A + 2)mod8 |
| Third layer | (A + 4)mod8 | (A + 4)mod8 |
| Fourth layer | (A + 6)mod8 | (A + 6)mod8 |
| OCC index | 0 | 1 |

A is a cyclic shift value of a DMRS transmitted on the DCI format 0, and it may have any one of values 0 to 7. Cyclic shift values allocated to respective layers within each UE or order of the cyclic shift values allocated between UEs may be changed. Furthermore, the OCC index may be changed within UE to which the same cyclic shift value is allocated.

Furthermore, if each UE has four transmit antennas and performs rank-4 transmission, the cyclic shift values according to the present invention may be allocated to four UEs. Table 16 shows an example in which cyclic shift values are allocated to four layers within each of four UEs. Here, an OCC index has a length of 1 bit and may have any one of values 0 and 1.

TABLE 16

|  | First UE | Second UE | Third UE | Fourth UE |
| --- | --- | --- | --- | --- |
| First layer | A | A | B | B |
| Second layer | (A + 2)mod8 | (A + 2)mod8 | (B + 2)mod8 | (B + 2)mod8 |
| Third layer | (A + 4)mod8 | (A + 4)mod8 | (B + 4)mod8 | (B + 4)mod8 |
| Fourth layer | (A + 6)mod8 | (A + 6)mod8 | (B + 6)mod8 | (B + 6)mod8 |
| OCC index | 0 | 1 | 0 | 1 |

A is a cyclic shift value of a DMRS transmitted on the DCI format 0, and it may have any one of values 0 to 7. B is a value different from A and (A+4)mod 8, and it may have any one of values 0 to 7 like A. Cyclic shift values allocated to respective layers within each UE or order of the cyclic shift values allocated between UEs may be changed. Furthermore, the OCC index may be changed within UE to which the same cyclic shift value is allocated.

Table 17 shows another example in which cyclic shift values are allocated to four layers within each of four UEs. Here, an OCC index has a length of 2 bits and may have any one of values 0 to 3.

TABLE 17

|  | First UE | Second UE | Third UE | Fourth UE |
| --- | --- | --- | --- | --- |
| First layer | A | A | A | A |
| Second layer | (A + 2)mod8 | (A + 2)mod8 | (A + 2)mod8 | (A + 2)mod8 |
| Third layer | (A + 4)mod8 | (A + 4)mod8 | (A + 4)mod8 | (A + 4)mod8 |
| Fourth layer | (A + 6)mod8 | (A + 6)mod8 | (A + 6)mod8 | (A + 6)mod8 |
| OCC index | 0 | 1 | 2 | 3 |

A is a cyclic shift value of a DMRS transmitted on the DCI format 0, and it may have any one of values 0 to 7. Cyclic shift values allocated to respective layers within each UE or order of the cyclic shift values allocated between UEs may be changed. Furthermore, the OCC index may be changed within UE to which the same cyclic shift value is allocated.

Meanwhile, the present invention may also be applied to a case where an ACK/NACK signal for a plurality of codewords is transmitted on a plurality of PHICHs. Like in the case where an ACK/NACK signal for a plurality of codewords is transmitted on one PHICH, a probability that PHICH resources for a plurality of UEs may collide with each other can be reduced by allocating cyclic shift values through which the PHICH resources may collide with each other to a plurality of layers within one UE. It is however necessary to set at least two different cyclic shift values so that resources to which a plurality of respective PHICHs are allocated do not collide with each other in order to allocate the plurality of PHICHs to each UE.

Different cyclic shift values may be allocated to UEs that perform uplink MU-MIMO transmission.

If each UE has two transmit antennas and performs rank-2 transmission, cyclic shift values according to the present invention may be allocated to two UEs. It is assumed that two different cyclic shift values are necessary for each UE because each UE performs rank-2 transmission and two PHICH resources are allocated to each UE. Table 18 shows an example in which cyclic shift values for a first PHICH are allocated to two layers within two UEs.

TABLE 18

|  | First layer | Second layer |
|---|---|---|
| First UE | A | (A + 4)mod8 |
| Second UE | B | (B + 4)mod8 |

A is a cyclic shift value of a DMRS transmitted on the DCI format 0, and it may have any one of values 0 to 7. B is a value different from A and (A+4)mod 8, and it may have any one of values 0 to 7 like A. Cyclic shift values allocated to respective layers within each UE or order of the cyclic shift values allocated between UEs may be changed.

If a rule that PHICH resources are allocated is different from a rule that cyclic shift values are allocated between layers, second PHICH resources in the first UE may be allocated based on $n_{DMRS}=(A+\alpha)$mod 8. Furthermore, second PHICH resources in the second UE may be allocated based on $n_{DMRS}=(B+\alpha)$mod 8. $\alpha$ may have any one of values 1 to 8 and may have the same value when it is applied to the first UE and the second UE.

Furthermore, if a rule that PHICH resources are allocated is different from a rule that cyclic shift values are allocated between layers, cyclic shift values that do not generate a collision between the PHICH resources may be allocated to each layer in order to prevent a collision between PHICH resources between different codewords within one UE. That is, cyclic shift values may be allocated to each layer as in Table 19.

TABLE 19

|  | First layer | Second layer |
|---|---|---|
| First UE | A | (A + α)mod8 |
| Second UE | B | (B + α)mod8 |

$\alpha$ may have any one of values 1 to 8. A is a cyclic shift value of a DMRS transmitted on the DCI format 0, and it may have any one of values 0 to 7. B is a value different from A, and it may have any one of values 0 to 7 like A. Cyclic shift values allocated to respective layers within each UE or order of the cyclic shift values allocated between UEs may be changed.

If each UE has two transmit antennas and performs rank-2 transmission, cyclic shift values according to the present invention may be allocated to four UEs. It is assumed that two different cyclic shift values are necessary for each UE because each UE performs rank-2 transmission and two PHICH resources are allocated to each UE. Table 20 shows an example in which cyclic shift values for a first PHICH are allocated to two layers within four UEs.

TABLE 20

|  | First layer | Second layer |
|---|---|---|
| First UE | A | (A + 4)mod8 |
| Second UE | B | (B + 4)mod8 |

TABLE 20-continued

|  | First layer | Second layer |
|---|---|---|
| Third UE | C | (C + 4)mod8 |
| Fourth UE | D | (D + 4)mod8 |

A is a cyclic shift value of a DMRS transmitted on the DCI format 0, and it may have any one of values 0 to 7. B is a value different from A and (A+4)mod 8, and it may have any one of values 0 to 7 like A. C is a value different from A, (A+4)mod 8, B, and (B+4)mod 8, and it may have any one of values 0 to 7. D is a value different from A, (A+4)mod 8, B, (B+4)mod 8, C, and (C+4)mod 8, and it may have any one of values 0 to 7. Cyclic shift values allocated to respective layers within each HE or order of the cyclic shift values allocated between UEs may be changed.

If a rule that PHICH resources are allocated is different from a rule that cyclic shift values are allocated between layers, second PHICH resources in the first UE to the fourth HE may be allocated on the basis of $n_{DMRS}=(A+\alpha)$mod 8, $n_{DMRS}=(B+\alpha)$mod 8, $n_{DMRS}=(C+\alpha)$mod 8, and $n_{DMRS}=(D+\alpha)$mod 8, respectively. A may have any one of values 1 to 8 and may have the same value when it is applied to the first UE to the fourth UE.

Furthermore, if a rule that PHICH resources allocated is identical with a rule that cyclic shift values is allocated between layers, cyclic shift values that do not generate a collision between the PHICH resources may be allocated to each layer in order to prevent a collision between PHICH resources between different codewords within one UE. That is, cyclic shift values may be allocated to each layer as in Table 21.

TABLE 21

|  | First layer | Second layer |
|---|---|---|
| First UE | A | (A + α)mod8 |
| Second UE | B | (B + α)mod8 |
| Third UE | C | (C + α)mod8 |
| Fourth UE | D | (D + α)mod8 |

$\alpha$ may have any one of values 1 to 8. A is a cyclic shift value of a DMRS transmitted on the DCI format 0, and it may have any one of values 0 to 7 like A. B is a value different from A, and it may have any one of values 0 to 7. C is a value different from A and B, and it may have any one of values 0 to 7. D is a value different from A, B, and C, and it may have any one of values 0 to 7. Cyclic shift values allocated to respective layers within each UE or order of the cyclic shift values allocated between UEs may be changed.

If each UE has four transmit antennas and performs rank-4 transmission, cyclic shift values according to the present invention may be allocated to two UEs. It is assumed that different four cyclic shift values are necessary for each UE because each UE performs rank-4 transmission and two PHICH resources are allocated to each UE. Table 22 shows an example in which cyclic shift values for a first PHICH are allocated to four layers within two UEs, respectively.

TABLE 22

|  | First layer | Second layer | Third layer | Fourth layer |
|---|---|---|---|---|
| First UE | A | (A + 4)mod8 | (A + 2)mod8 | (A + 6)mod8 |
| Second UE | B | (B + 4)mod8 | (B + 2)mod8 | (B + 6)mod8 |

A is a cyclic shift value of a DMRS transmitted on the DCI format 0, and it may have any one of values 0 to 7. B is a value different from A and (A+4)mod 8, and it may have any one of values 0 to 7 like A. Cyclic shift values allocated to respective layers within each UE or order of the cyclic shift values allocated between UEs may be changed.

If a rule that PHICH resources are allocated is different from a rule that cyclic shift values are allocated between layers, second PHICH resources in the first UE and the second UE may be allocated on the basis of $n_{DMRS}=(A+\alpha)\bmod 8$ and $n_{DMRS}=(B+\alpha)\bmod 8$. $\alpha$ may have any one of values 1 to 8 and may have the same value when it is applied to the first UE and the second UE.

Furthermore, if a rule that PHICH resources are allocated is different from a rule that cyclic shift values are allocated between layers, cyclic shift values that do not generate a collision between the PHICH resources may be allocated to each layer in order to prevent a collision between PHICH resources between different codewords within one UE. That is, cyclic shift values may be allocated to each layer as in Table 23.

TABLE 23

|  | First layer | Second layer | Third layer | Fourth layer |
|---|---|---|---|---|
| First UE | A | (A + α)mod8 | (A + 4)mod8 | (A + α + 4)mod8 |
| Second UE | B | (B + α)mod8 | (B + 4)mod8 | (B + α + 4)mod8 |

α may have any one of values 1 to 8. A is a cyclic shift value of a DMRS transmitted on the DCI format 0, and it may have any one of values 0 to 7. B is a value different from A, and it may have any one of values 0 to 7 like A. Cyclic shift values allocated to respective layers within each UE or order of the cyclic shift values allocated between UEs may be changed.

If each UE has four transmit antennas and performs rank-4 transmission, cyclic shift values according to the present invention may be allocated to four UEs. It is assumed that different four cyclic shift values are necessary for each UE because each UE performs rank-4 transmission and two PHICH resources are allocated to each UE. Table 24 shows an example in which cyclic shift values for a first PHICH are allocated to four layers within four UEs.

TABLE 24

|  | First layer | Second layer | Third layer | Fourth layer |
|---|---|---|---|---|
| First UE | A | (A + 4)mod8 | (A + 2)mod8 | (A + 6)mod8 |
| Second UE | B | (B + 4)mod8 | (B + 2)mod8 | (B + 6)mod8 |
| Third UE | C | (C + 4)mod8 | (C + 2)mod8 | (C + 6)mod8 |
| Fourth UE | D | (D + 4)mod8 | (D + 2)mod8 | (D + 6)mod8 |

A is a cyclic shift value of a DMRS transmitted on the DCI format 0, and it may have any one of values 0 to 7. B is a value different from A and (A+4)mod 8, and it may have any one of values 0 to 7 like A. C is a value different from A, (A+4)mod 8, B, and (B+4)mod 8, and it may have any one of values 0 to 7. D is a value different from A, (A+4)mod 8, B, (B+4)mod 8, C, and (C+4)mod 8, and it may have any one of values 0 to 7. Cyclic shift values allocated to respective layers within each UE or order of the cyclic shift values allocated between UEs may be changed.

If a rule that PHICH resources are allocated is different from a rule that cyclic shift values are allocated between layers, second PHICH resources in the first UE to the fourth UE may be allocated on the basis of $n_{DMRS}=(A+\alpha)\bmod 8$, $n_{DMRS}=(B+\alpha)\bmod 8$, $n_{DMRS}=(C+\alpha)\bmod 8$, and $n_{DMRS}=(D+\alpha)\bmod 8$. $\alpha$ may have any one of values 1 to 8 and may have the same value when it is applied to the first UE to the fourth UE.

Furthermore, if a rule that PHICH resources are allocated is the same as a rule that a cyclic shift value is allocated between layers, cyclic shift values that do not generate a collision between the PHICH resources may be allocated to each layer in order to prevent a collision between PHICH resources between different codewords within one UE. That is, cyclic shift values may be allocated to each layer as in Table 25.

TABLE 25

|  | First layer | Second layer | Third layer | Fourth layer |
|---|---|---|---|---|
| First UE | A | (A + α)mod8 | (A + 4)mod8 | (A + α + 4)mod8 |
| Second UE | B | (B + α)mod8 | (B + 4)mod8 | (B + α + 4)mod8 |
| Third UE | C | (C + α)mod8 | (C + α)mod8 | (C + α + 4)mod8 |
| Fourth UE | D | (D + α)mod8 | (D + α)mod8 | (D + α + 4)mod8 |

α may have any one of values 1 to 8. A is a cyclic shift value of a DMRS transmitted on the DCI format 0, and it may have any one of values 0 to 7. B is a value different from A, and it may have any one of values 0 to 7 like A. C is a value different from A and B, and it may have any one of values 0 to 7. D is a value different from A, B, and C, and it may have any one of values 0 to 7. Cyclic shift values allocated to respective layers within each UE or order of the cyclic shift values allocated between UEs may be changed.

Meanwhile, since the number of PHICH sequences that may be allocated to one PHICH group in an extended CP format is 4, a plurality of PHICHs for a plurality of codewords cannot be supported when the number of UEs is more than 4. Accordingly, in order to support a plurality of PHICHs when the number of UEs is more than 4, the number of PHICH sequences within one PHICH group may be increased. As an alternative, a plurality of PHICHs may be supported by using a new parameter not defined in LTE rel-8. The new parameter may be a static, semi-static, or dynamic parameter and may be signalized through radio resource control (RRC) signaling or may be signalized on a PDCCH through a DCI format.

Furthermore, even a plurality of PHICH resources is allocated, the same cyclic shift value may be allocated to UEs that perform uplink MU-MIMO transmission as in FIG. 22, but the UEs may be distinguished from each other by using different OCC indices for the multiplexing of reference signals.

Figure 23:
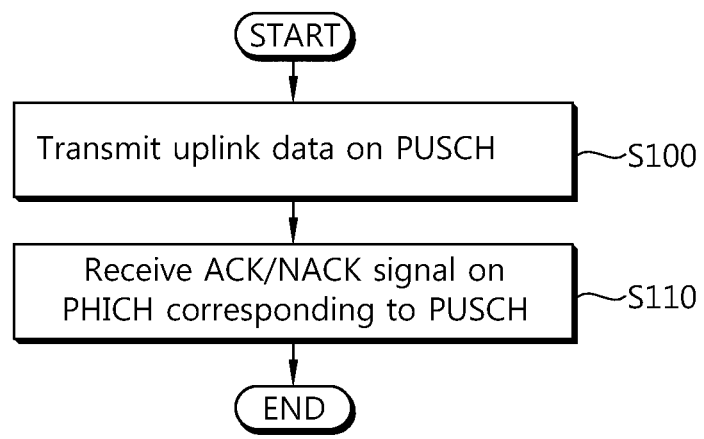
FIG. 23 is a block diagram showing an embodiment of a proposed method of performing an HARQ.

FIG. 23 is a block diagram showing an embodiment of a proposed method of performing an HARQ. At step S100, user equipment transmits uplink data to a BS on a PUSCH. At step S110, the UE receives an ACK/NACK signal, indicating whether the uplink data has been received or not, from the BS through a plurality of layers on a PHICH corresponding to the PUSCH. Here, PHICH resources for the plurality of layers do not overlap with each other, and the PHICH resources may have different cyclic shift values.

Figure 24:
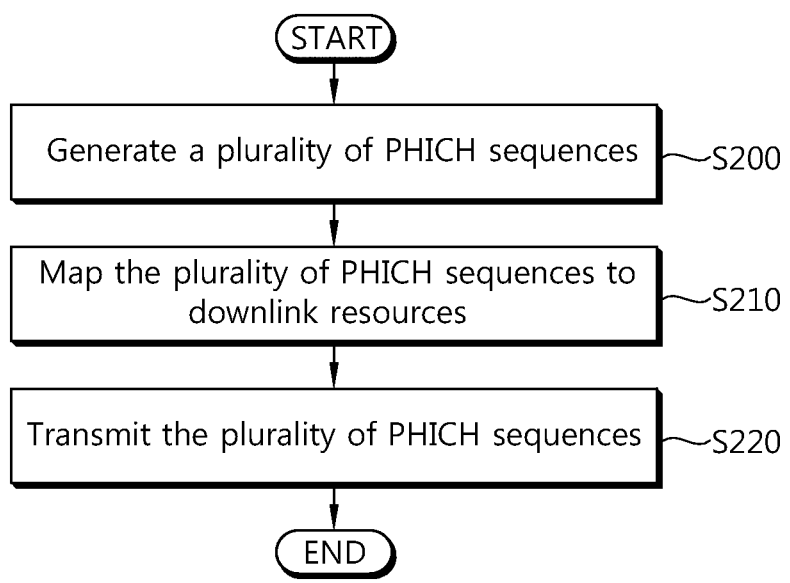
FIG. 24 shows an embodiment of a proposed method of transmitting a downlink control signal.

FIG. 24 shows an embodiment of a proposed method of transmitting a downlink control signal.

At step S200, a BS generates a plurality of PHICH sequences for a plurality of UEs. At step S210, the BS maps the generated PHICH sequences to downlink resources. Here, resources to which the plurality of PHICH sequences is mapped do not overlap with each other within each of the UEs. At step S220, the BS transmits the mapped PHICH sequences to the UEs.

Figure 25:
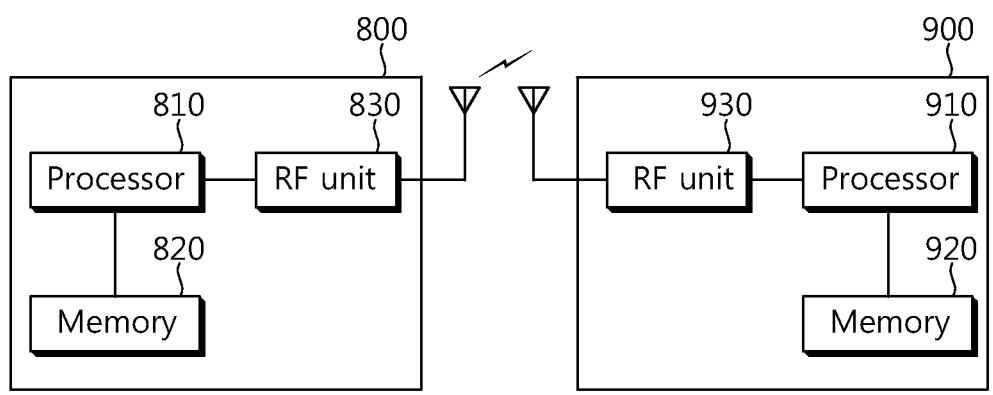
FIG. 25 is a block diagram showing a BS and UE in which the embodiments of the present invention are implemented.

FIG. 25 is a block diagram showing a BS and UE in which the embodiments of the present invention are implemented.

The BS 800 includes a processor 810, memory 820, and a radio frequency (RF) unit 830. The processor 810 implements the proposed functions, processes and/or methods. The layers of a radio interface protocol may be implemented by the processor 810. The processor 810 allocates PHICH resources for transmitting an ACK/NACK signal. The memory 820 is coupled to the processor 810, and it stores various pieces of information for driving the processor 810. The RF unit 830 is connected to the processor 810, and it sends and/or receives radio signals and sends an ACK/NACK signal through the allocated PHICH resources.

The UE 900 includes a processor 910, memory 920, and an RF unit 930. The RF unit 930 is connected to the processor 910, and it sends uplink data on a PUSCH.

The processor 910 implements the proposed functions, processes and/or methods. The layers of a radio interface protocol may be implemented by the processor 910. The processor 910 processes a received ACK/NACK signal. The memory 920 is connected to the processor 910, and it stores various pieces of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of performing, by a user equipment, a hybrid automatic repeat request (HARQ) in a wireless communication system, the method comprising:

transmitting uplink data on a physical uplink shared channel (PUSCH), and receiving an acknowledgement/non-acknowledgement (ACK/NACK) signal indicating whether the uplink data has been received or not, through a plurality of layers on a physical HARQ indicator channel (PHICH) corresponding to the PUSCH, wherein downlink resources to which a PHICH for each of the plurality of layers is mapped do not overlap with each other, and wherein the downlink resources to which the PHICH for each of the plurality of layers is mapped are determined based on different cyclic shift values allocated to each of the plurality of layers respectively, wherein the downlink resources to which the PHICH for each of the plurality of layers is mapped are determined based on an equation below:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}, \text{ and}$$

wherein $n_{PHICH}^{group}$ is a PHICH group index, $n_{PHICH}^{seq}$ is an orthogonal sequence index within a PHICH group, $I_{PRB\_RA}^{lowest\_index}$ is an index of a smallest physical resource block (PRB) from among PRBs to which the PUSCH is mapped, $n_{DMRS}$ is an uplink demodulation reference signal (DMRS) cyclic shift parameter, $N_{PHICH}^{group}$ is a number of PHICH groups, and $N_{SF}^{PHICH}$ is a spreading factor (SF).

2. The method of claim 1, wherein when a number of the plurality of layers is 2, the cyclic shift value allocated to each of the plurality of layers has a difference of 4.

3. The method of claim 1, wherein when a number of the plurality of layers is 4, the cyclic shift value allocated to each of the plurality of layers has a difference of 2.

4. The method of claim 1, wherein the cyclic shift value allocated to each of the plurality of layers is any one of 0 to 7.

5. The method of claim 1, wherein one of the cyclic shift values allocated to each of the plurality of layers is determined by a cyclic shift field within downlink control information (DCI) transmitted through a physical downlink control channel (PDCCH).

6. The method of claim 1, wherein the $N_{PHICH}^{group}=4$ and the $2N_{SF}^{PHCIH}=4$.

7. The method of claim 1, further comprising transmitting re-transmission data of the uplink data based on the ACK/NACK signal.

8. The method of claim 1, wherein the downlink resources are carried on a physical downlink control channel (PDCCH).

9. A method of performing, by a user equipment, a hybrid automatic repeat request (HARQ) in a wireless communication system, the method comprising:

transmitting, by a first user equipment and a second user equipment, first uplink data and second uplink data, respectively, to a base station on a physical uplink shared channel (PUSCH), and transmitting, by a base station, a first acknowledgement/non-acknowledgement (ACK/NACK) signal and a second ACK/NACK signal indicating whether the first uplink data and the second uplink data have been received or not, to the first user equipment and the second user equipment, respectively, through a plurality of layers on a physical HARQ indicator channel (PHICH) corresponding to the PUSCH, wherein downlink resources to which a PHICH for each of the plurality of layers is mapped are determined based on cyclic shift values allocated to each of the plurality of layers respectively, wherein the downlink resources to which the PHICH for each of the plurality of layers is mapped are determined based on an equation below:

$$n_{PHICH}^{group} = (I_{PRB\_RA}^{lowest\_index} + n_{DMRS} + n_{OCC}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS} + n_{OCC}) \bmod 2N_{SF}^{PHICH}, \text{ and}$$

wherein $n_{PHICH}^{group}$ is a PHICH group index, $n_{PHICH}^{seq}$ is an orthogonal sequence index within a PHICH group, $I_{PRB\_RA}^{lowest\_index}$ is an index of a smallest physical resource block (PRB) from among PRBs to which the PUSCH is mapped, $n_{DMRS}$ is an uplink demodulation reference signal (DMRS) cyclic shift parameter, $N_{PHICH}^{group}$ is a number of PHICH groups, $n_{OCC}$ is an OCC index, and $N_{SF}^{PHICH}$ is a spreading factor (SF).

10. The method of claim 9, wherein when a number of the plurality of layers is 2, the cyclic shift value allocated to each of the plurality of layers has a difference of 4.

11. The method of claim 9, wherein when a number of the plurality of layers is 4, the cyclic shift value allocated to each of the plurality of layers has a difference of 2.

12. The method of claim 9, wherein the cyclic shift value allocated to each of the plurality of layers is any one of 0 to 7.

13. The method of claim 9, wherein different OCC indices are allocated to the first UE and the second UE.

\* \* \* \* \*